(12) United States Patent
Levey et al.

(10) Patent No.: US 12,459,802 B2
(45) Date of Patent: Nov. 4, 2025

(54) SYSTEMS, METHODS, AND DEVICES FOR INGREDIENT BASED DISPENSING

(71) Applicant: Starbucks Corporation, Seattle, WA (US)

(72) Inventors: Jonathan Levey, Geneseo, NY (US); Ryan T. Bell, Mill Creek, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 18/625,669

(22) Filed: Apr. 3, 2024

(65) Prior Publication Data

US 2024/0336469 A1 Oct. 10, 2024

Related U.S. Application Data

(60) Provisional application No. 63/494,549, filed on Apr. 6, 2023.

(51) Int. Cl.
*B67D 1/00* (2006.01)

(52) U.S. Cl.
CPC ......... *B67D 1/0024* (2013.01); *B67D 1/0037* (2013.01); *B67D 2210/00031* (2013.01)

(58) Field of Classification Search
CPC ............... B67D 1/0024; B67D 1/0037; B67D 2210/00031; B67D 2001/082; B67D 2001/0828; B67D 1/0079; B67D 1/0431; B67D 1/0462; B67D 1/0888; B67D 1/102; B67D 1/1204; B67D 1/0039; A47G 19/183
See application file for complete search history.

(56) References Cited

U.S. PATENT DOCUMENTS

| | | | | |
|---|---|---|---|---|
| 4,096,971 | A * | 6/1978 | Kuckens | B67D 1/0036 222/145.5 |
| 7,806,294 | B2 * | 10/2010 | Gatipon | B67D 1/0022 222/1 |
| 2011/0017776 | A1 * | 1/2011 | Metropulos | B67D 1/0041 222/129.1 |
| 2019/0300357 | A1 * | 10/2019 | Crawford | G07F 13/065 |
| 2021/0221667 | A1 | 7/2021 | Venkatakrishnan et al. | |

(Continued)

FOREIGN PATENT DOCUMENTS

| | | | | |
|---|---|---|---|---|
| DE | 3836825 A1 * | 6/1989 | | B67D 1/0888 |
| WO | WO-2022169540 A1 * | 8/2022 | | A47J 31/40 |

(Continued)

OTHER PUBLICATIONS

International Search Report and Written Opinion in application No. PCT/US2024/022865, mailed on Sep. 30, 2024, in 26 pages.

*Primary Examiner* — Bob Zadeh
(74) *Attorney, Agent, or Firm* — Knobbe, Martens, Olson & Bear, LLP

(57) ABSTRACT

The disclosure generally relates to an ingredient-based dispensing system for creating customized beverages with ingredients (e.g., using various sauces, syrups, sweeteners, colors and/or flavors added to a base beverage). The ingredient-based dispensing system may include a volume-based dispensing system for automatically dispensing ingredients with a varying viscosity (e.g., sauces) and a time-based dispensing system for automatically dispensing ingredients with a consistent viscosity (e.g., flavors, syrups, and/or colors).

10 Claims, 16 Drawing Sheets

(56) References Cited

U.S. PATENT DOCUMENTS

| | | | | |
|---|---|---|---|---|
| 2022/0144619 | A1* | 5/2022 | Otto | B67D 1/0888 |
| 2023/0069727 | A1* | 3/2023 | Comunale | B67D 1/1204 |
| 2023/0257246 | A1* | 8/2023 | Fantappie | B67D 1/0034 |
| | | | | 222/52 |
| 2023/0294974 | A1* | 9/2023 | Callaghan | B67D 1/1281 |
| | | | | 222/545 |
| 2024/0336469 | A1* | 10/2024 | Levey | B67D 1/102 |

FOREIGN PATENT DOCUMENTS

| | | | | |
|---|---|---|---|---|
| WO | WO-2022169559 A1 * | 8/2022 | | B01F 33/846 |
| WO | WO-2022169564 A1 * | 8/2022 | | B67D 1/0035 |
| WO | WO 2024/211434 A2 | 10/2024 | | |

* cited by examiner

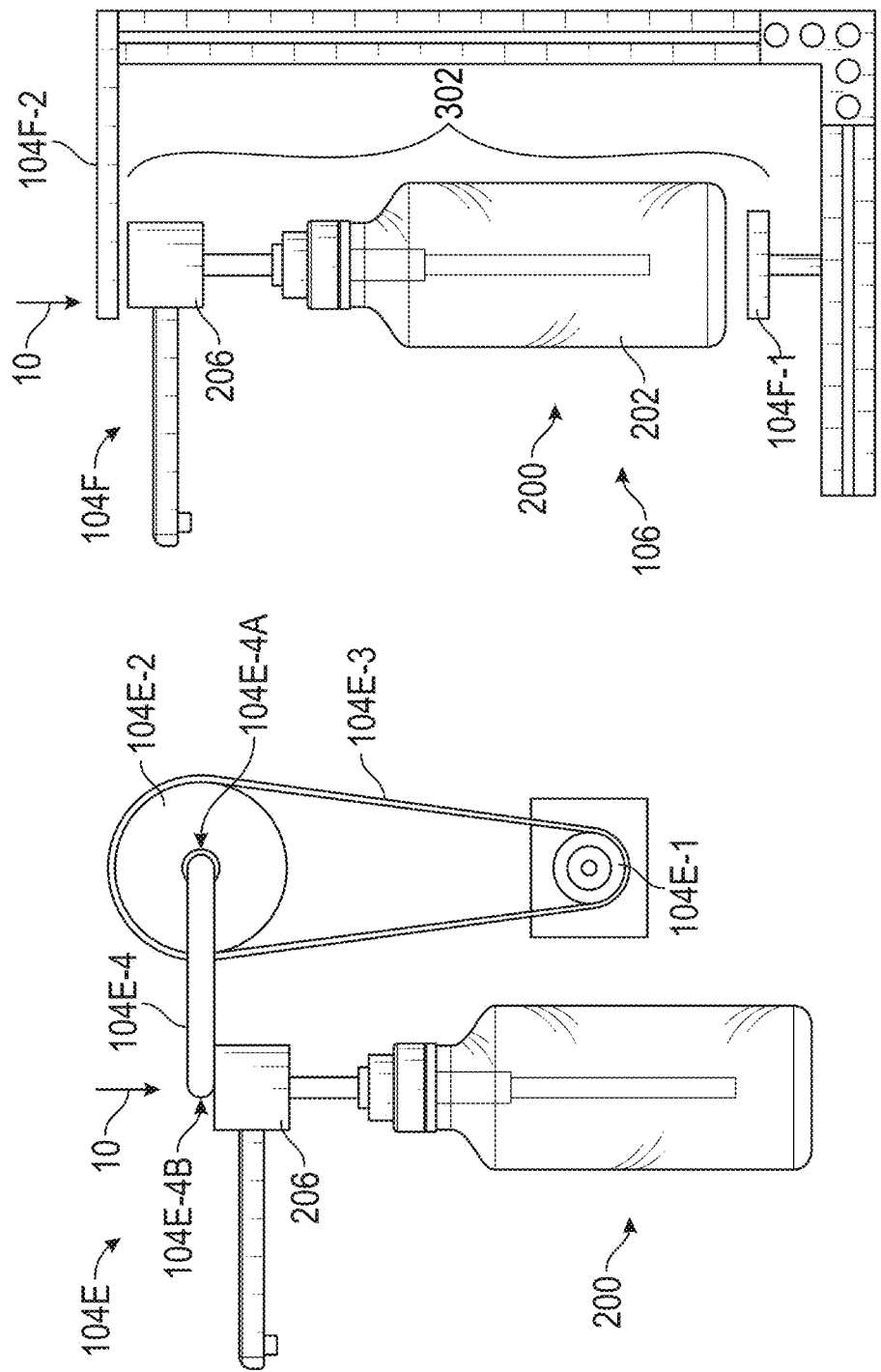

SYSTEMS, METHODS, AND DEVICES FOR INGREDIENT BASED DISPENSING

INCORPORATION BY REFERENCE TO ANY PRIORITY APPLICATIONS

This application claims priority to U.S. Provisional Patent Application No. 63/494,549, filed Apr. 6, 2023, the entirety of which is incorporated herein by reference.

FIELD

The present disclosure relates to systems, methods, and devices for dispensing ingredients of a beverage order, such as, in certain embodiments, volume-based dispensing systems and time-based dispensing systems.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

In some embodiments, an ingredient based dispensing system can include a volume-based dispensing system including one or more volume-based dispensers; a time-based dispensing system including one or more time-based dispensers; a control system including: a communication module configured to receive a beverage order including one or more ingredients; and a controller configured to communicate instructions for dispensing the one or more ingredients to the volume-based dispensing system and the time-based dispensing system based on the beverage order.

In some embodiments, the one or more volume-based dispensers can each include: a housing configured to receive a manual pump dispenser via a recess in the housing, wherein the manual pump dispenser includes a container configured to hold a first ingredient type, and a pump configured to dispense the first ingredient type when a pump head of the pump is displaced; an actuation system configured to displace the pump head of the manual pump dispenser.

In some embodiments, the first ingredient type can include sauces.

In some embodiments, the first ingredient type can include a viscosity, the viscosity can vary between about 8 percent and about 80 percent.

In some embodiments, the actuation system can include a linear actuation system, a rail actuation system, a fulcrum actuation system, a rotary actuation system, a pulley actuation system, and/or a platform actuation system.

In some embodiments, the one or more volume-based dispensers can each include: a housing configured to receive a manual pump dispenser via a recess in the housing, wherein the manual pump dispenser includes a container configured to hold a first ingredient type, and a pump configured to dispense the first ingredient type when a pump head of the pump is actuated; an actuation system configured to displace the container of the manual pump dispenser in order to actuate the pump head so the pump head remains stationary.

In some embodiments, the one or more time-based dispensers can each include: a container configured to hold a second ingredient type, the container including a lid removably coupled to the container; a spout configured to dispense the second ingredient type, the spout including a valve configured to open and close the spout for a predetermined time.

In some embodiments, the second ingredient type can include one or more of flavors, syrups, and/or colorings.

In some embodiments, the volume-based dispensing system and the time-based dispensing system can each include a user interface configured to display beverage order information to a user, and/or receive inputs from the user.

In some embodiments, the beverage order information can include a dispensing sequence of the one or more ingredients, a dose size of the one or more ingredients, and/or an indication whether each of the one or more ingredients has been dispensed.

In some embodiments, the container of the time-based dispensing system can be pressurized.

In some embodiments, the container of the time-based dispensing system can include one or more sensors configured to determine when the lid is removed from the container.

In some embodiments, the container of the time-based dispensing system can be configured to automatically depressurize when the lid is removed from the container.

In some embodiments, the actuation system can be configured to apply a first force to the pump head of the manual dispenser to displace the pump head in a first direction, and the actuation system can be configured to apply a second force to the pump head of the manual dispenser to displace the pump head in a second direction opposite the first direction.

In some embodiments, an ingredient based dispensing system can include a first dispensing system configured to dispense sauces; a second dispensing system configured to dispense flavors, syrups, and/or colors; a control system including a communication module configured to receive a beverage order including one or more ingredients; and a controller configured to communicate instructions for dispensing the one or more ingredients to the first dispensing system and the second dispensing system based on the beverage order.

In some embodiments, the first dispensing system can be a volume-based dispensing system, and the second dispensing system is a time-based dispensing system.

In some embodiments, the first dispensing system can include one or more volume-based dispensers, wherein the one or more volume-based dispensers can each include a housing configured to receive a manual pump dispenser via a recess in the housing, wherein the manual pump dispenser includes a container configured to hold a first ingredient type, and a pump configured to dispense the first ingredient type when a pump head of the pump is displaced; an actuation system configured to displace the pump head of the manual pump dispenser.

In some embodiments, the first dispensing system can include one or more volume-based dispensers, wherein the one or more volume-based dispensers can each include a housing configured to receive a manual pump dispenser via a recess in the housing, wherein the manual pump dispenser includes a container configured to hold a first ingredient type, and a pump configured to dispense the first ingredient type when a pump head of the pump is actuated; an actuation system configured to displace the container of the manual pump dispenser in order to actuate the pump head so the pump head remains stationary.

In some embodiments, the second dispensing system can include one or more time-based dispensers, wherein the one or more time-based dispensers can each include a container configured to hold a second ingredient type, the container including a lid removably coupled to the container; a spout configured to dispense the second ingredient type, the spout including a valve configured to open and close the spout for a predetermined time.

In some embodiments, a method of dispensing a beverage order via an ingredient based dispensing system can include receiving a beverage order including a dose of one or more ingredients of a first ingredient type, and a dose of one or more ingredients of a second ingredient type, transmitting instructions for dispensing the one or more ingredients of the first ingredient type to a first dispensing system; transmitting instructions for dispensing the one or more ingredients of the first ingredient type to a second dispensing system; dispensing, via the first dispensing system, each of the one or more ingredients of the first ingredient type, dispensing, via the second dispensing system, each of the one or more ingredients of the second ingredient type.

In some embodiments, the first ingredient type can include ingredients with a varying viscosity.

In some embodiments, the second ingredient type can include ingredients with a consistent viscosity, wherein the consistent viscosity can vary between about 1 percent and about 5 percent.

In some embodiments, the first ingredient type can include sauces, and the second ingredient type can include flavors, syrups, and/or colorings.

In some embodiments, dispensing, via the first dispensing system, each of the one or more ingredients of the first ingredient type can include dispensing a predetermined volume of each of the one or more ingredients of the first ingredient type, and the predetermined volume can be based on a number of doses of each of the one or more ingredients of the first ingredient type the beverage order.

In some embodiments, dispensing, via the second dispensing system, each of the one or more ingredients of the second ingredient type can include dispensing each of the one or more ingredients of the second ingredient type for a predetermined dispensing time, and the predetermined dispensing time can be based on a number of doses of each of the one or more ingredients of the second ingredient type in the beverage order.

In some embodiments, the first dispensing system can include a volume-based dispensing system, wherein the volume-based dispensing system includes one or more volume-based dispensers, each of the one or more volume-based dispensers including: a housing configured to receive a manual pump dispenser via a recess in the housing, wherein the manual pump dispenser includes a container configured to hold an ingredient of the first ingredient type, and a pump configured to dispense the ingredient of the first ingredient type when a pump head of the pump is displaced; an actuation system configured to displace the pump head of the manual pump dispenser.

In some embodiments, the first dispensing system can include a volume-based dispensing system, wherein the volume-based dispensing system includes one or more volume-based dispensers, each of the one or more volume-based dispensers including: a housing configured to receive a manual pump dispenser via a recess in the housing, wherein the manual pump dispenser includes a container configured to hold an ingredient of the first ingredient type, and a pump configured to dispense the ingredient of the first ingredient type when a pump head of the pump is actuated; an actuation system configured to displace the container of the manual pump dispenser in order to actuate the pump head so the pump head remains stationary.

In some embodiments, the second dispensing system can include a time-based dispensing system, wherein the time-based dispensing system includes one or more time-based dispensers, each of the one or more time-based dispensers including: a container configured to hold an ingredient of the second ingredient type, the container including a lid removably coupled to the container; a spout configured to dispense the ingredient of the second ingredient type, the spout including a valve configured to open and close the spout for the predetermined dispensing time.

In some embodiments, the method can include displaying, via a first user interface of the first dispensing system, one or more dispensing points of the first dispensing system for each of the one or more ingredients of the first ingredient type; and displaying, via second user interface of the second dispensing system, one or more dispensing points of the second dispensing system for each of the one or more ingredients of the second ingredient type.

In some embodiments, the method can include receiving, via a first user interface of the first dispensing system, a first user selection to dispense each of the one or more ingredients of the first ingredient type; and receiving, via second user interface of the second dispensing system, a second user selection to dispense each of the one or more ingredients of the second ingredient type.

In some embodiments, a volume-based dispenser can include a housing; a recess in the housing, the recess configured to receive a manual pump dispenser, wherein the manual pump dispenser includes a container configured to hold an ingredient, and a pump configured to dispense the ingredient when a pump head of the pump is displaced from an uncompressed position; and an actuation system configured to apply a force to the pump head to displace the pump head, wherein the actuation system automatically displaces the pump from an uncompressed position to a predetermined position based on a volume of the ingredient in a beverage order.

In some embodiments, the actuation system can include a pump head receiver, wherein the pump head receiver includes a recess configured to receive the pump head.

In some embodiments, the pump head can friction fit and/or snap fit into the recess of the pump head receiver.

In some embodiments, the actuation system can include an actuator and a rod configured to extend from the actuator and retract into the actuator.

In some embodiments, the actuator can positioned above the pump head or behind the container when the manual pump dispenser is in the recess.

In some embodiments, the predetermined position can be a compressed position and/or a position between the uncompressed position and the compressed position.

In some embodiments, the predetermined position can be based on a dose size of the ingredient.

In some embodiments, a volume-based dispenser can include a user interface, wherein the user interface can be configured to display ingredient information to a user and/or receive one or more inputs from a user.

In some embodiments, the one or more inputs can include a selection of a dose size, a number of doses, and/or a selection to dispense the ingredient.

In some embodiments, the actuation system can be configured to move the container in order to displace the pump head from the uncompressed position to the predetermined position so the pump head remains stationary.

In some embodiments, the actuation system can include an arm positioned above the pump head and an actuator configured to move the container, the arm can be configured to apply the force to the pump head when the actuator moves the container.

BRIEF DESCRIPTION OF THE DRAWINGS

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

FIGS. 3A-3F illustrate various embodiments of an actuation system of the automatic volume-based dispenser of FIG. 1.

DETAILED DESCRIPTION

Figure 1:
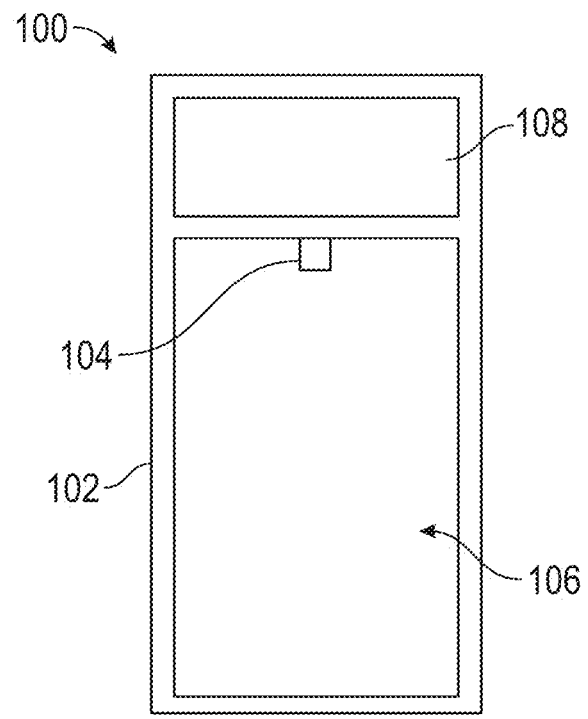
FIG. 1 illustrates a schematic of an embodiment of an automatic volume-based dispenser.

Although several embodiments, examples, and illustrations are disclosed below, it will be understood by those of ordinary skill in the art that the system, methods, and devices described herein extend beyond the specifically disclosed embodiments, examples, and illustrations and includes other uses of the system, methods, and devices and obvious modifications and equivalents thereof. Embodiments of the disclosure are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the disclosure. In addition, embodiments of the disclosure can comprise several novel features and no single feature is solely responsible for its desirable attributes or is essential to practicing the system, methods, and devices herein described.

Coffee or tea beverages usually have a base of coffee or tea extracts mixed with dairy enhanced by a variety of textures, tastes, flavors, colors and/or aromas. One can create different textures, tastes, flavors, colors and aromas by adding different quantities of ingredients or modifiers (e.g., sauces, syrups and flavors) or adding the same ingredients or modifiers in different sequences. For example, to create a menu offering of 70 handcrafted coffee beverages, there may be 10 flavors, 2 syrups and 7 sauces. Flavors are usually alcohol based. Examples of some flavors are vanilla, toffee nut, and hazelnut. Sauces are usually multiple ingredients blended together in a water solution and may include a viscosity that varies significantly based on a volume of the sauce in a container and/or a particular batch of the sauce. Examples of some sauces are white chocolate mocha, chai and mocha. Syrups are usually liquid forms of sugar or sugar-free substitutes.

Many sauces are inherently dense and viscous. Hence, dispensing sauces from a manual dispensing pump may require a lot of effort to manually push down on a pump lever. For very viscous sauces with a viscosity between about 200 cP and about 70,000 cP, forces in excess of 20 pounds to 30 pounds can be required to dispense the sauce from a manual mechanical pump. Each beverage may require multiple pumps for multiple shots or doses. For a barista making hundreds of beverages on a shift, manually pumping sauces or other ingredients frequently with this high force can lead to arm fatigue.

A recipe for a creamy coffee beverage could be to dispense hot espresso coffee extract into a cup, followed by two pumps of vanilla syrup, followed by a pump of white chocolate mocha sauce, followed by a fixed volume of steamed almond milk and finished with two pumps of toffee nut flavor. The recipe for a non-creamy beverage could be the same ingredients and quantities but dispensed in a different order (e.g., dispense a pump of white chocolate mocha sauce, followed by two pumps of vanilla syrup, followed by a fixed volume of steamed almond milk and followed with two pumps of toffee nut flavor and finished by dispensing a hot espresso coffee extract on top). Different beverages are made not only by varying the type and quantities of ingredients or modifiers (e.g., sauces, syrups and flavors), but also by changing the order in which they are added to the beverage.

A coffee store may offer a menu with 80-100 hand-crafted beverages. This means that each barista must memorize the recipes for each of the 80-100 beverages, including the ingredients or modifiers (e.g., sauces, syrups and flavors) in each beverage, the number of pumps, shots or doses, and the order in which the ingredients or modifiers are added. This creates a lot of complexity and memorization effort, which creates a challenge to expansion of the size and variety of the menu (e.g., variety of beverages).

When a coffee store introduces a new beverage recipe that uses a new type of sauce, syrup, or flavor, it must procure a new pump unit or system customized to the new ingredient. This is expensive as a new container needs to be manufactured and filled for every new type of ingredient. This leads to lot of complexity in the store as the store must procure, store, and use a variety of pumps for all the different ingredients (e.g., sauces, syrups and flavors). The baristas must also be retrained on the new recipes.

Customers like to adjust the amount of ingredients, modifiers, or enhancers (e.g., sauce, syrup, and flavor) in their beverages to suit their individual taste and health needs. Manual pump systems can be inconsistent due to human error when dispensing ingredients (i.e., inconsistent forces and stroke lengths). Automatically dispensing sauces based on time can lead to inconsistent amounts of the sauces in a beverage due to the varying viscosity of sauces. This is inherently problematic to the customer experience as customers want more customization with precise control of the amount of ingredients, modifiers, or enhancers in their beverages. In addition, baristas may want to simplify the mental and physical efforts required in the beverage preparation process.

Automatic dispensing systems may allow for automatic dispensing of ingredients, modifiers, or enhancers, however, if the dispenser malfunctions or breaks, a barista may not be able to dispense the ingredients, modifiers, or enhancers which can significantly reduce beverage throughput at high volumes coffee stores.

In accordance with several embodiments, the systems described herein advantageously automate the dispensing of ingredients, modifiers or enhancers (e.g., sauces, syrups, flavors, tastes, colors, reductions). The systems include automatic volume-based dispensers configured to dispense sauces via interfacing with manual pumps, and/or time-based dispensers, that can dispense any type of ingredient without any force (e.g., any manual pumping force) exerted by the barista. If the automatic volume-based dispensers malfunctions, the barista can remove the manual pump from the automatic volume-based dispenser and dispense ingredients, modifiers or enhancers manually. A user interface may guide the barista through the sequence of dispensing (including the recipes for various beverages), thereby avoiding memorization of recipes, while also doing away with the complexity of cleaning (e.g., of manually cleaning multiple reusable pump containers or units on a regular basis).

Figure 2A:
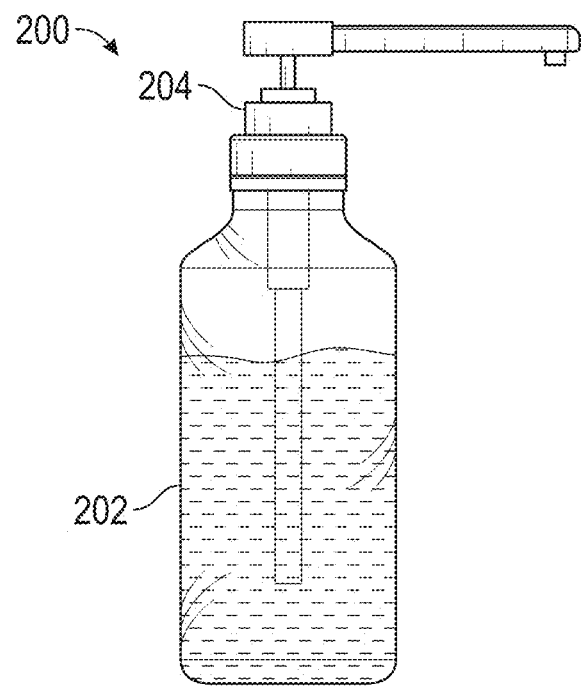
FIG. 2A illustrates an ingredient dispenser for use with the automatic volume-based dispenser of FIG. 1.
Figure 2B:
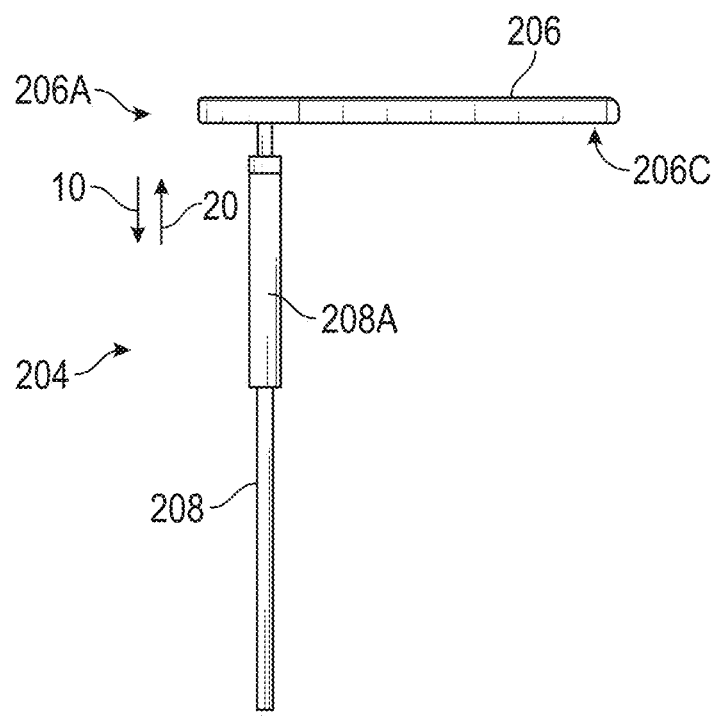
FIG. 2B illustrates a pump of the ingredient dispenser of FIG. 2A with a pump head in an uncompressed position.

FIG. 1 shows a schematic of an automatic dispenser 100 for volume-based dispensing. In some embodiments, the automatic dispenser 100 may include a housing 102 and an actuation system 104. In some embodiments, the housing 102 may include a recess 106. The recess 106 may be configured to receive an ingredient dispenser 200, as shown in FIGS. 2A and 2B. In some embodiments, the actuation system 104 may be configured to dispense an ingredient contained in the ingredient dispenser 200, as described further below.

In some embodiments, the automatic dispenser 100 may include one or more sensors. In some embodiments, the one or more sensors may be configured to automatically determine or sense if an ingredient dispenser 200 is placed in the recess 106. In some embodiments, the one or more sensors may include a weight sensor configured to determine or sense if the ingredient dispenser 200 is empty. In some embodiments, the one or more sensors may be configured to determine when a beverage container is placed at the automatic dispenser 100. In some embodiments, the automatic dispenser 100 may automatically dispense the ingredient contained in the ingredient dispenser 200 when the one or more sensors determine a beverage container is placed at the automatic dispenser 100.

In some embodiments, the housing 102 of the automatic dispenser 100 may include a user interface 108. The user interface 108 may include a display, and/or one or more buttons or inputs. In some embodiments, the user interface 108 may include a touch screen. The user interface 108 may be configured to display beverage or ingredient information to the user. The user interface 108 may be configured to display an ingredient contained in an ingredient dispenser 200 in the recess 106. The user interface 108 may be configured to display an amount of the ingredient to be dispensed by the automatic dispenser 100. In some embodiments, the user interface 108 may be configured to indicate to the user when the ingredient dispenser 200 is empty.

In some embodiments, the user interface 108 may be configured to indicate to the user to place a beverage container at the automatic dispenser 100 so the automatic dispenser 100 can dispense the ingredient contained in the ingredient dispenser 200 into the beverage container.

In some embodiments, a user may input a selection to the user interface 108 to dispense the ingredient contained in the ingredient dispenser 200. In some embodiments, the user may input a selection to the user interface 108 to dispense a selected amount of the ingredient contained in the ingredient dispenser 200.

In some embodiments, if the automatic dispenser 100 malfunctions, breaks down, or otherwise stops functioning correctly, the user may remove the ingredient dispenser 200 from the automatic dispenser 100 to manually dispense the ingredient via the ingredient dispenser 200.

In some embodiments, the recess 106 may be configured to receive two or more ingredient dispensers 200. In some embodiments, the two ingredient dispensers 200 may be positioned in the recess 106 so the pump head 206 of each ingredient dispenser 200 is offset (i.e., at a different position). In some embodiments, a first dispenser 200 of the ingredient dispensers 200 may be positioned behind a second dispenser 200 of the ingredient dispensers 200. In some embodiments, the pump head 206 of the first dispenser 200 of the ingredient dispensers 200 may be offset from the pump head 206 of the second dispenser 200 of the ingredient dispensers 200 by an angle 30, as shown in FIG. 10B. In some embodiments, the angle 30 may include an angle of about 5 degrees, about 10 degrees, about 15 degrees, about 20 degrees, about 25 degrees about 30 degrees, about 35 degrees, about 45 degrees, about 60 degrees, about 75 degrees, about 90 degrees, and/any value between the aforementioned values. In some embodiments, the angle 30 may include an angle between about 15 degrees and about 45 degrees. In some embodiments, the angle 30 may include an angle between about 25 degrees and about 45 degrees. In some embodiments, the actuation system 104 may be configured to dispense ingredients from both of the two ingredient dispensers 200. In some embodiments, the automatic dispenser 100 may include two actuation systems 104 to dispense ingredients from both of the two ingredient dispensers 200.

As shown in FIG. 2A, the ingredient dispenser 200 may include a container 202 and a pump 204. The container 202 may be configured to hold an ingredient. The ingredient may include ingredients of an ingredient type that includes an inconsistent or varying viscosity, for example, sauces. In some embodiments, the ingredient may include a sauce that includes natural ingredients.

In some embodiments, the viscosity of the ingredient may vary between one or more containers 202 and/or one or more batches of the ingredient. In some embodiments, the viscosity of the ingredient may vary based on a volume or amount of the ingredient in the container 202. In some embodiments, the viscosity of the ingredient may vary by about 1 percent, about 2 percent, about 3 percent, about 4 percent, about 5 percent, about 6 percent, about 7 percent, about 8 percent, about 9 percent, about 10 percent, about 11 percent, about 12 percent, about 13 percent, about 14 percent, about 15 percent, about 16 percent, about 17 percent, about 18 percent, about 19 percent, about 20 percent, about 30 percent, about 40 percent, about 50 percent, about 60 percent, about 70 percent, about 80 percent, about 90 percent, about 100 percent, and/or any value between the aforementioned values. In some embodiments, the viscosity of the ingredient may vary between about 8 percent and about 80 percent. In some embodiments, the viscosity of the ingredient may vary between about 5 percent and about 15 percent. In some embodiments, the viscosity of the ingredient may vary between about 8 percent and about 12 percent. In some embodiments, the ingredient may include a consistent viscosity and the viscosity may vary between about 1 percent and about 5 percent.

As shown in FIG. 2B, the pump 204 may include a pump head 206 and a tube 208. The tube 208 may include an ingredient holding portion 208A. In some embodiments, the ingredient holding portion 208A may be configured to hold a predetermined volume of ingredient.

Figure 2C:
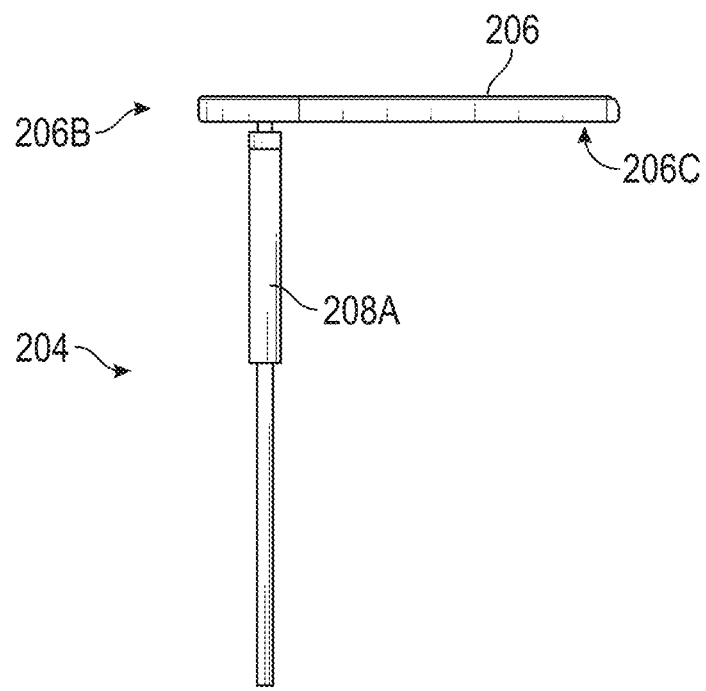
FIG. 2C illustrates the pump of FIG. 2B with the pump head in a compressed position.

The pump head 206 may be displaced between an uncompressed position 206A, shown in FIG. 2B and a compressed position 206B shown in FIG. 2C. In some embodiments, the pump head 206 may be displaced from the uncompressed position 206A to the compressed position 206B and the pump 204 may dispense the predetermined volume of ingredient via an opening 206C of the pump head 206. In some embodiments, a force 10 may be applied to the pump head 206 to displace the pump head 206 from the uncompressed position 206A to the compressed position 206B.

In some embodiments, the pump head 206 may be displaced from the uncompressed position 206A to a position between the uncompressed position 206A and the compressed position 206B, and the pump 204 may dispense a portion of the predetermined volume of ingredient via the opening 206C of the pump head 206. The portion of the predetermined volume of ingredient dispensed by the pump 204 may be based on a distance the pump head 206 is displaced from the uncompressed position 206A. In some embodiments, the force 10 may be applied to the pump head 206 to displace the pump head 206 from the uncompressed position 206A to the position between the uncompressed position 206A and the compressed position 206B.

In some embodiments, the pump head 206 may be configured to automatically return to the uncompressed position 206A. The pump head 206 may return to the uncompressed position 206A when the force 10 is no longer applied to the pump head 206. In some embodiments, the pump head 206 may return to the uncompressed position 206A after the force 10 is applied to the pump head 206. In some embodiments, a second force 20 may be applied the pump head 206 in a direction opposite the direction of the force 10 in order to return the pump head 206 to the uncompressed position 206A.

As shown in FIG. 1, the actuation system 104 of the automatic dispenser 100 may be configured to displace the pump head 206 from the uncompressed position 206A to the uncompressed position 206A and/or a position between the uncompressed position 206A and the compressed position 206B. The actuation system 104 may apply the force 10 to the pump head 206 and/or a top surface of the pump head 206 to displace the pump head 206. The actuation system may apply the second force 20 to the pump head 206 to displace the pump head 206. In some embodiments, the actuation system 104 may include an actuator, a motor and/or pneumatics configured to control the actuation system 104. In some embodiments, the actuation system 104 may displace the pump head 206 at a particular speed to a particular position. The particular speed may include a velocity less than a maximum displacement velocity of the pump 204. The maximum displacement velocity of the pump 204 may include a velocity that may cause the pump 204 to bottom out. In some embodiments, the particular speed and/or the particular position may be based on a dose size of an ingredient in the container 202.

Figure 3B:
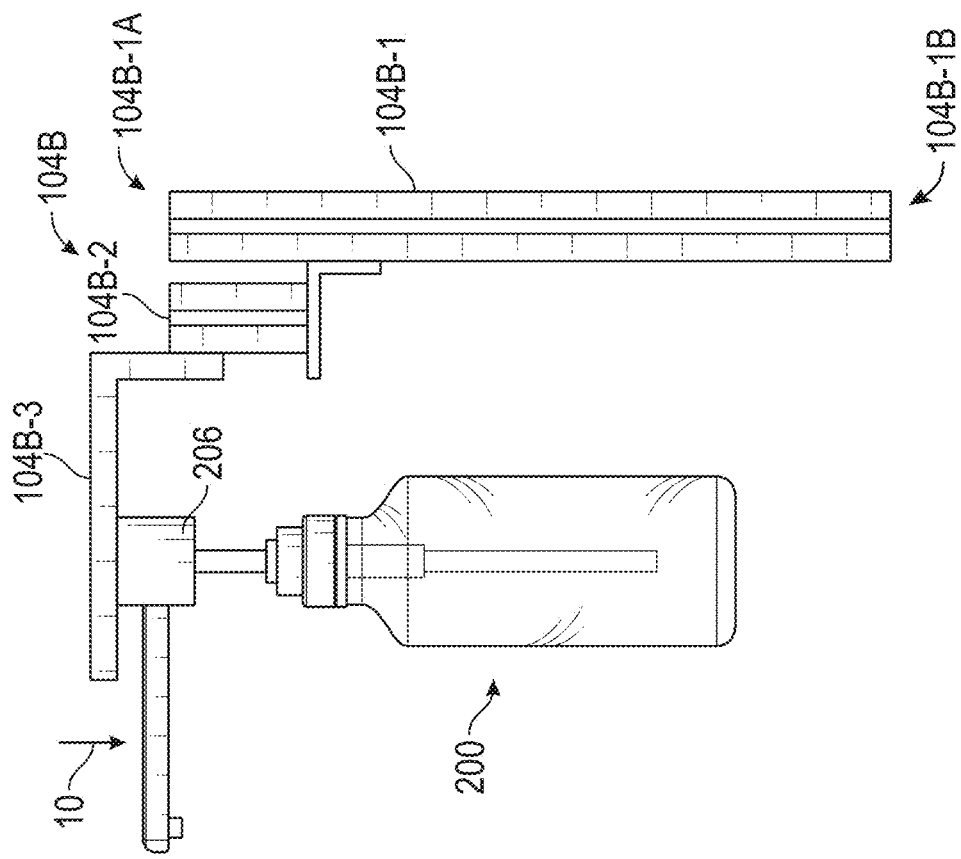
Figure 3A:
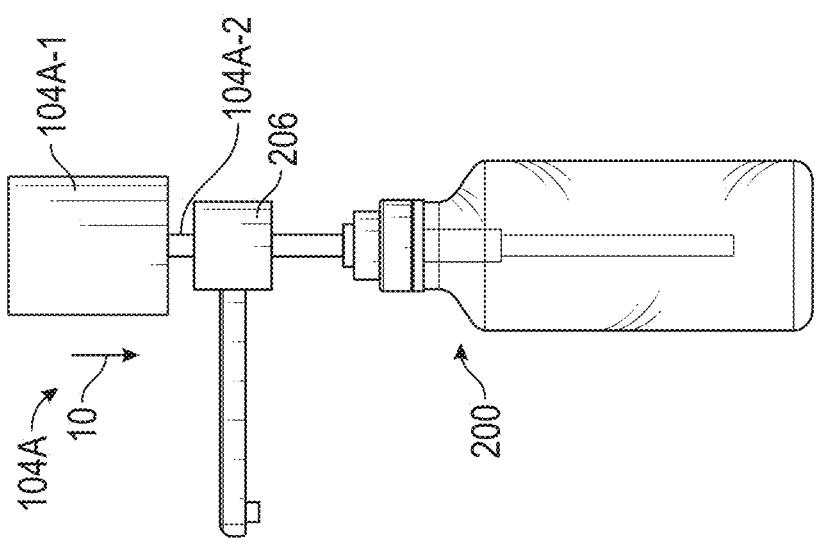

FIGS. 3A-3F show various embodiments of the actuation system 104. In some embodiments, as shown in FIG. 3A, the actuation system 104 may include a linear actuation system 104A. The linear actuation system 104A can include a body 104A-1 and a rod 104A-2 configured to extend from and/or retract into the body 104A-1. The body 104A-1 may contain an actuator, a motor, and/or pneumatics configured to extend and/or retract the rod 104A-2. The linear actuation system 104A may be positioned above the ingredient dispenser 200 and/or the pump head 206. The linear actuation system 104A may be positioned so when the rod 104A-2 extends from the body 104A-1, the rod 104A-2 moves downwards and/or towards the ingredient dispenser 200. In some embodiments, when the rod 104A-2 extends from the body 104A-1 the rod 104A-2 may apply the force 10 to the pump head 206 to displace the pump head 206.

Figure 4A:
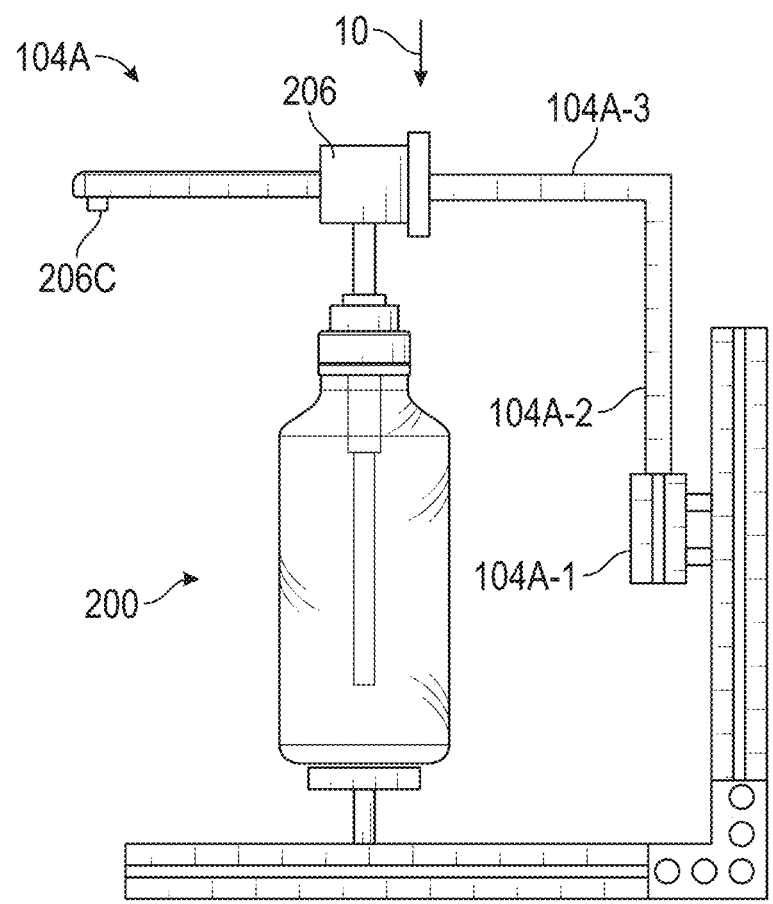
FIG. 4A illustrates an actuation system positioned above the pump head of the pump of FIGS. 2A and 2B.
Figure 4B:
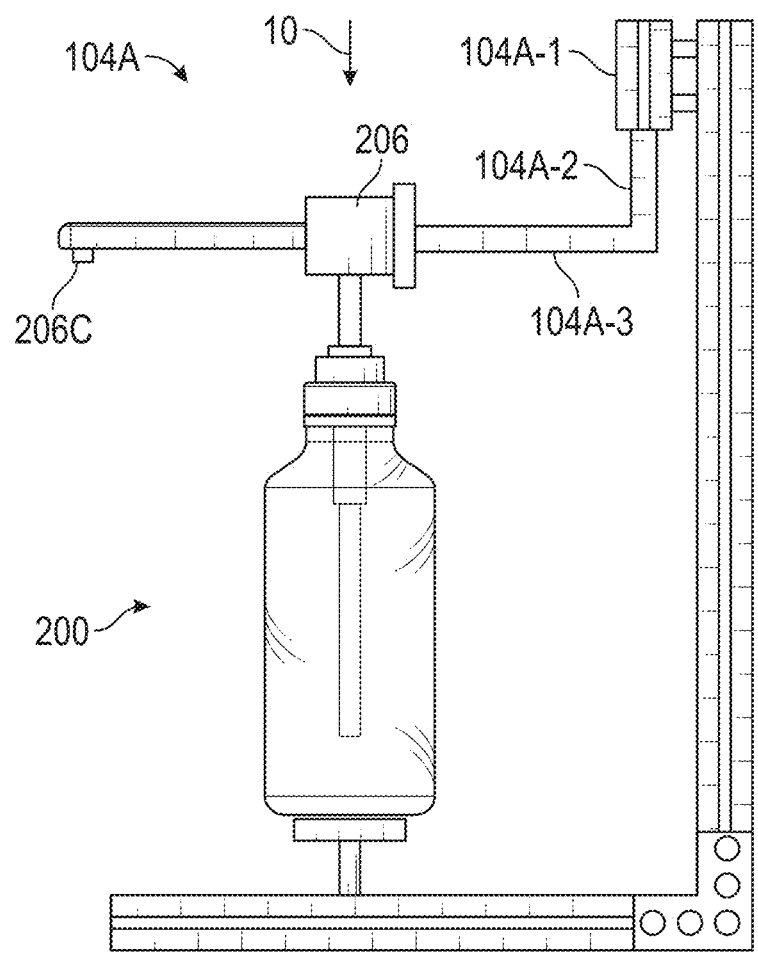
FIG. 4B illustrates an actuation system positioned below the pump head of the pump of FIGS. 2A and 2B.

In some embodiments, as shown in FIGS. 4A and 4B, the linear actuation system 104A may be positioned behind the ingredient dispenser 200 wherein behind is opposite the opening 206C of the pump head. The body 104A-1 of the linear actuation system 104A may be positioned above the pump head 206, as shown in FIG. 4A, or below the pump head 206, as shown in FIG. 4B. The linear actuation system 104A can include an arm 104A-3 that may extend substantially perpendicular from the rod 104A-2, so the arm 104A-3 is positioned above the pump head 206.

In some embodiments, as shown FIG. 4A, when the rod 104A-2 retracts into the body 104A-1, the arm 104A-3 can apply the force 10 to the pump head 206 to displace the pump head 206. In some embodiments, as shown in FIG. 4B, when the rod 104A-2 extends from the body 104A-1, the arm 104A-3 can apply the force 10 to the pump head 206 to displace the pump head 206.

In some embodiments, as shown in FIG. 3B, the actuation system 104 may include a rail actuation system 104B. The rail actuation system 104B can include a rail 104B-1, a carriage 104B-2, and an arm 104B-3. In some embodiments, the rail 104B-1 may be positioned behind the ingredient dispenser 200. In some embodiments, the carriage 104B-2 may be configured to translate along the rail 104B-1 between a top end 104B-1A and a bottom end 104B-1B of the rail 104B-1. The carriage 104B-2 may be configured to translate vertically and/or substantially vertically along the rail 104B-1. The rail actuation system 104B may include an actuator, a motor, and/or pneumatics configured to translate the carriage 104B-2 along the rail 104B-1.

The arm 104B-3 may be coupled to the carriage 104B-2. The arm 104B-3 may extend from the carriage 104B-2 and over the pump head 206. In some embodiments, when the carriage 104B-2 translates in a downward direction towards the bottom end 104B-1B of the rail 104B-1, the arm 104B-3 may apply the force 10 to the pump head 206 to displace the pump head 206.

Figure 3D:
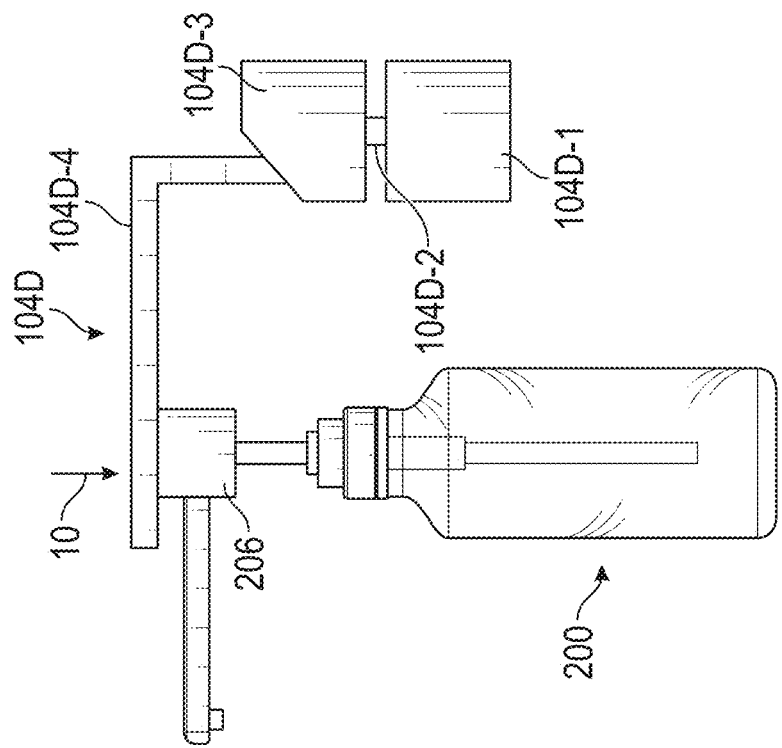
Figure 3C:
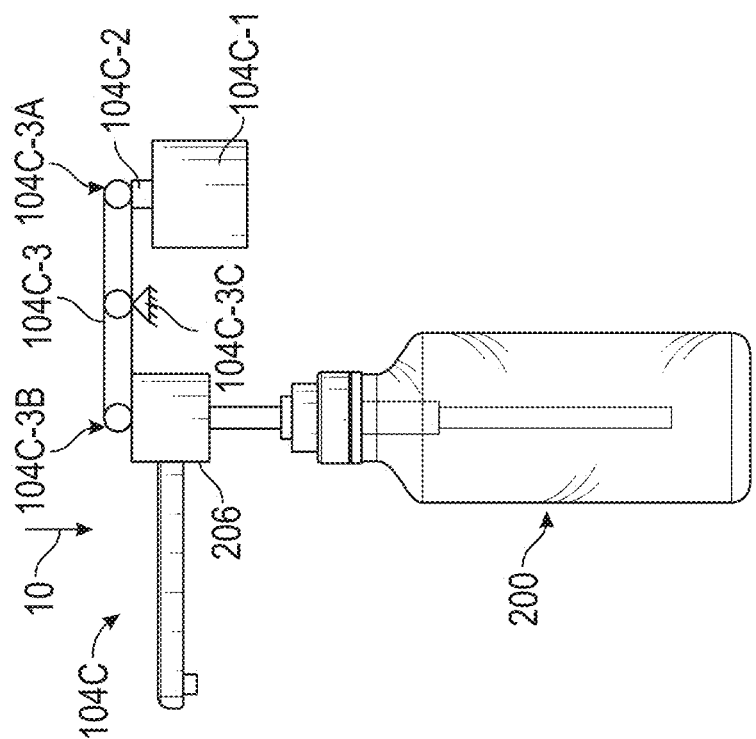

In some embodiments, as shown in FIG. 3C, the actuation system 104 may include a fulcrum actuation system 104C. The fulcrum actuation system 104C may include body 104C-1, a rod 104C-2, and an arm 104C-3. The rod 104C-2 may be configured to extend from and/or retract into the body 104C-1. The body 104C-1 may be positioned behind the ingredient dispenser 200. In some embodiments, the body 104C-1 may be positioned so the rod 104C-2 moves in an upward direction when the rod 104C-2 extends from the body 104C-1 and a downward direction when the rod 104C-2 retracts into the body 104C-1. The body 104C-1 may include an actuator, a motor, and/or pneumatics configured to extend and/or retract the rod 104C-1.

In some embodiments, the arm 104C-3 may include a first end 104C-3A and a second end 104C-3B opposite the first end 104C-3A. In some embodiments, the first end 104C-3A may be coupled to the rod 104C-2. In some embodiments, the arm 104C-3 may extend from the rod 104C-2 so the second end 104C-3B is positioned above and/or on the pump head 206.

The arm 104C-3 may include a fulcrum 104C-3C between the first end 104C-3A and the second end 104C-3B. In some embodiments, the arm 104C-3 may be configured to rotate about the fulcrum 104C-3C. In some embodiments, the fulcrum 104C-3C may include a point on the arm 104C-3 that is rotatably coupled to the housing 102 of the automatic dispenser 100.

In some embodiments, the first end 104C-3A may move or translate in an upward direction and/or a downward direction when the rod 104C-2 extends from and/or retracts into the body 104C-1. When the first end 104C-3A moves or translates in the upward direction, the arm 104C-3 may rotate about the fulcrum 104C-3C so the second end 104C-3B moves or translates in the downward direction. When the first end 104C-3A moves or translates in the downward direction, the arm 104C-3 may rotate about the fulcrum 104C-3C so the second end 104C-3B moves or translates in the upward direction. The second end 104C-3B may be configured to apply the force 10 to the pump head 206 to displace the pump head 206 when the second end 104C-3B moves or translates in the downward direction.

In some embodiments, as shown in FIG. 3D, the actuation system 104 may include a cam or rotary actuation system 104D. The rotary actuation system 104D may include a body 104D-1 and a rod 104D-2 that may extend from the body 104D-1. The rod 104D-2 may be configured to rotate. The body 104D-1 may include an actuator, a motor, and/or pneumatics configured to rotate the rod 104D-1. In some embodiments, the rotary actuation system 104D may include a cam assembly 104D-3. The cam assembly 104D-3 may be configured to convert rotation of the rod 104D-2 to linear motion of an arm 104D-4 (i.e., motion in the upward direction and/or the downward direction). The linear motion of the arm 104D-4 may apply the force 10 to the pump head 206 to displace the pump head 206.

In some embodiments, as shown in FIG. 3E, the actuation system 104 may include a pulley actuation system 104E. The pulley actuation system 104E may include a first wheel 104E-1, a second wheel 104E-2, and a drive belt 104E-3. The first wheel 104E-1 may be configured to rotate, and the drive belt 104E-3 may transfer rotation of the first wheel 104E-1 to the second wheel 104E-2. The pulley actuation system 104E may include an actuator, a motor, and/or pneumatics configured to rotate the first wheel 104E-1. In some embodiments, the pulley actuation system 104E may include an arm 104E-4 that may include a first end 104E-4A and a second end 104E-4B opposite the first end 104E-4A. The first end 104E-4A may be coupled to the second wheel 104E-2 so the arm 104E-4 may rotate when the second wheel 104E-2 rotates. In some embodiments, the second end 104E-4B may be positioned above the pump head 206 so the second end 104E-4B may apply the force 10 to the pump head 206 when the second wheel 104E-2 rotates.

In some embodiments, as shown in FIG. 3F, the actuation system 104 may include a platform actuation system 104F. In some embodiments, the platform actuation system 104F may include a platform 104F-1. The platform 104F-1 may be positioned at the bottom of the recess 106 so the bottom of the container 202 may be placed on the platform 104F-1 when the ingredient dispenser 200 is inserted into the recess 106. In some embodiments, the platform actuation system 104F may include an arm 104F-2 positioned above the pump head 206. In some embodiments, the arm 104F-2 may include the top of the recess 106.

The platform 104F-1 may be configured to extend from and/or retract into the bottom of the recess 106 to adjust a distance 302 between the platform 104F-1 and the arm 104F-2. In some embodiments, the platform 104F-1 may be configured to automatically extend from and/or retract into the bottom of the recess 106. The platform actuation system 104F-1 may include an actuator, a motor, and/or pneumatics configured to extends and/or retract the platform 104F-1. In some embodiments, the platform 104F-1 may extend from the bottom of the recess 106 to apply a force to the bottom of the container 202 so the arm 104F-2 may apply the force 10 to the pump head 206 to displace the pump head 206. In some embodiments, the platform actuation system 104F-1 may displace the container 202 so a position of the pump head 206 may remain in a same position when the pump head 206 is in the uncompressed position 206A, the compressed position 206B, and/or a position between the uncompressed position 206A and the compressed position 206B. Accordingly, the pump head 206 (e.g., the dispense point) may be actuated (e.g., displaced or pressed down), but the pump head 206 may remain stationary. Therefore, the pump head 206 may not move relative to a beverage container positioned under the pump head 206.

Figure 5:
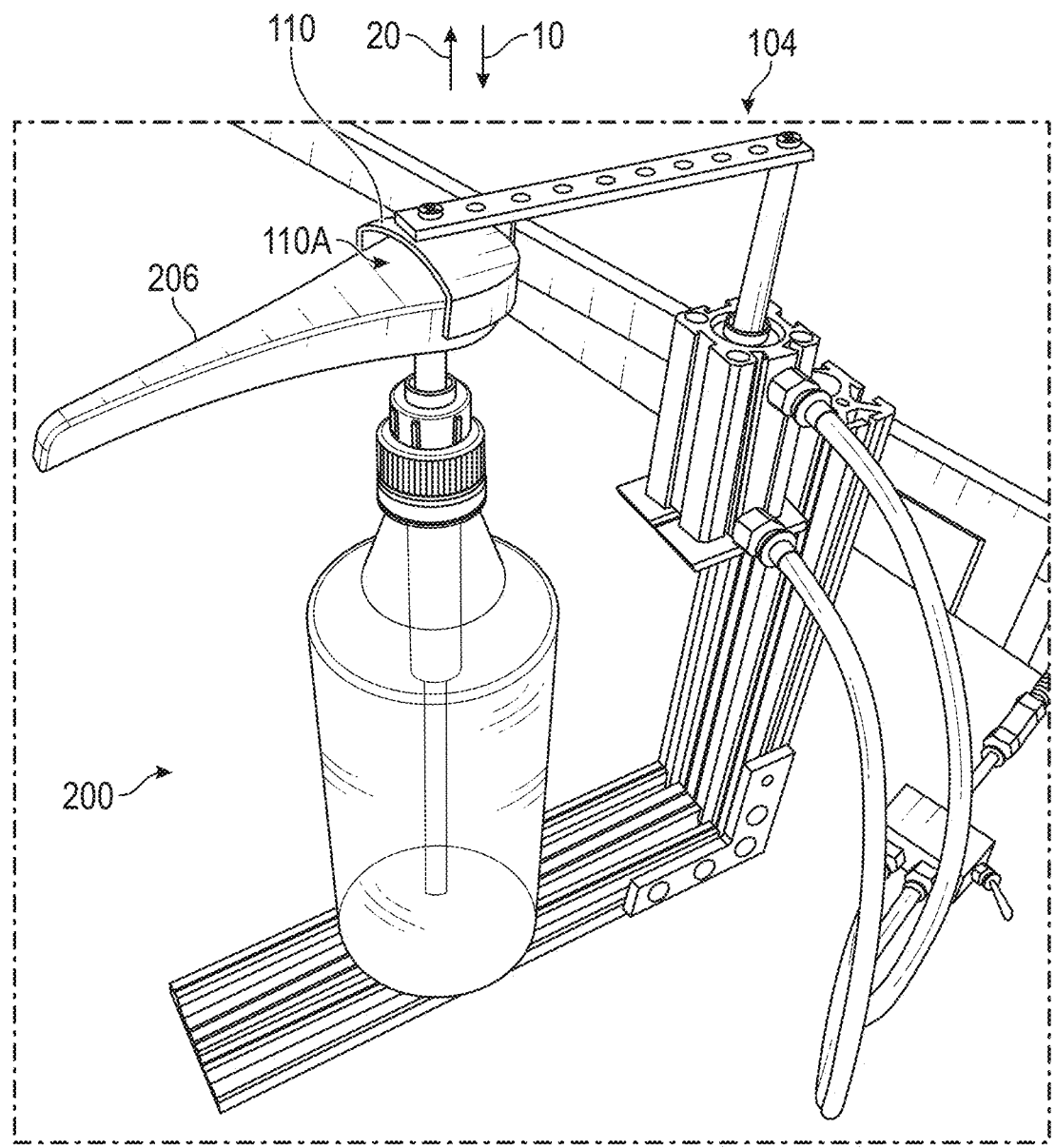
FIG. 5 illustrates an actuation system of the automatic volume-based dispenser of FIG. 1 with a pump head receiver.

FIG. 5 shows embodiment of the actuation system 104 with a pump head receiver 110. The pump head receiver 110 may include a recess 110A. The pump head receiver 110 may be shaped and/or sized so the pump head 206 may inserted into the recess 110A. The pump head receiver 110 may be configured to hold, keep or maintain the pump head 206 in a position so the pump head receiver 110 and/or the actuation system 104 can apply the force 10 to the pump head 206 to displace the pump head 206.

In some embodiments, the pump head 206 may snap fit and/or friction fit into the recess 110A of the pump head receiver 110 to removably couple the pump head 206 to the pump head receiver 110. The snap fit and/or friction fit may allow the actuation system 104 to apply a second force 20 to the pump head 206 in a direction opposite the force 10. The actuation system 104 may apply the second force 20 to the pump head 206 to displace the pump head from the compressed position 206B to the uncompressed position 206A and/or a position between the uncompressed position 206A and the compressed position 206B to the uncompressed position 206A.

In some embodiments, the snap fit and/or friction fit may indicate to a user that the pump head 206 and/or the ingredient dispenser 200 is properly inserted into the automatic dispenser 100 (i.e., positioned so the actuation system 104 can apply the force 10 to the pump head 206 to displace the pump head 206).

Figure 6A:
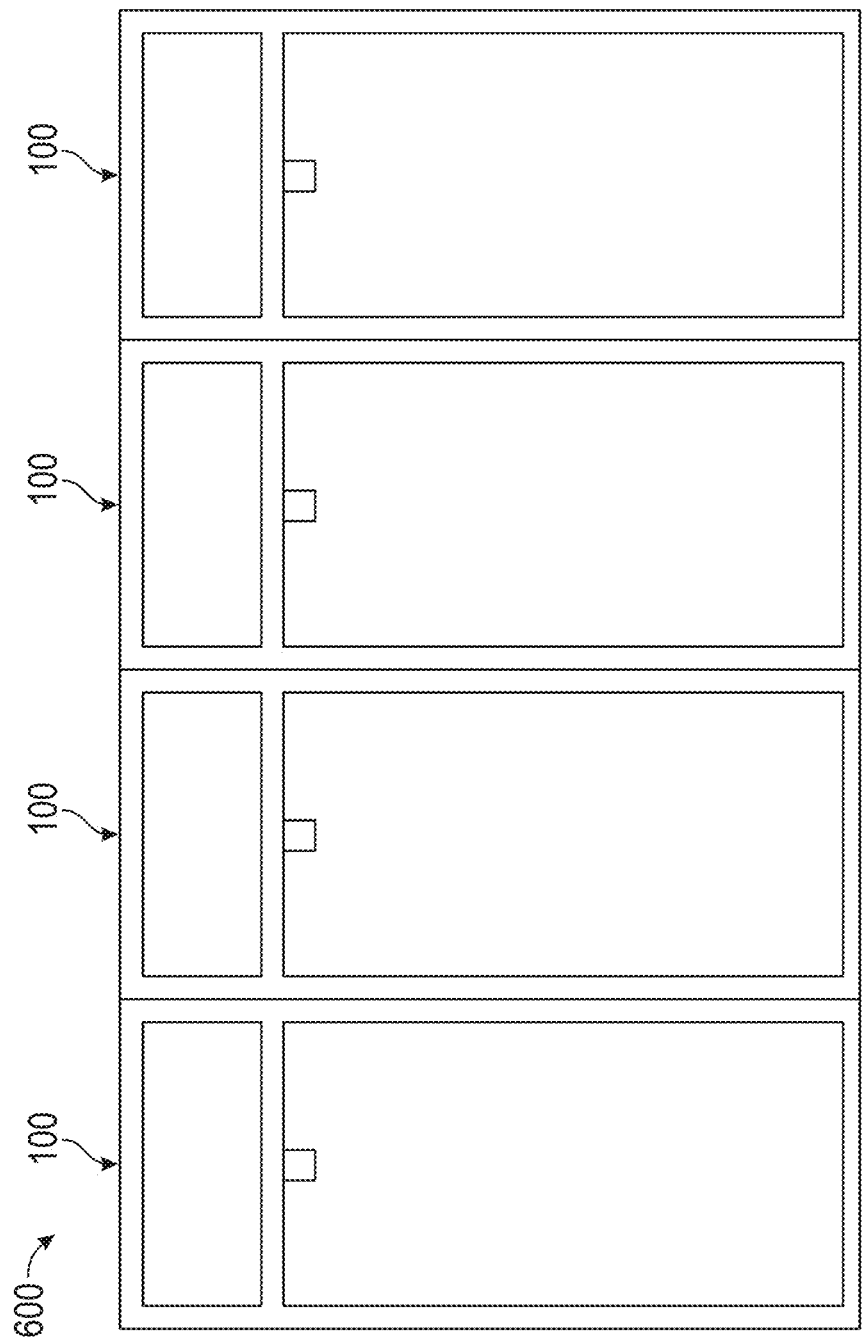
FIGS. 6A and 6B illustrate a volume-based dispensing system with a plurality of the automatic volume-based dispensers of FIG. 1.

FIG. 6A shows a system 600 for volume-based dispensing. The system 600 may include a plurality of automatic dispensers 100. In some embodiments, each of the plurality of automatic dispensers 100 may be positioned next to each other (i.e., in a line). Each of the plurality of automatic dispensers 100 may be configured to receive an ingredient dispenser 200. In some embodiments, each ingredient dispenser 200 may hold a different ingredient. In some embodiments, one or more ingredient dispensers 200 may hold a same ingredient.

Figure 10A:
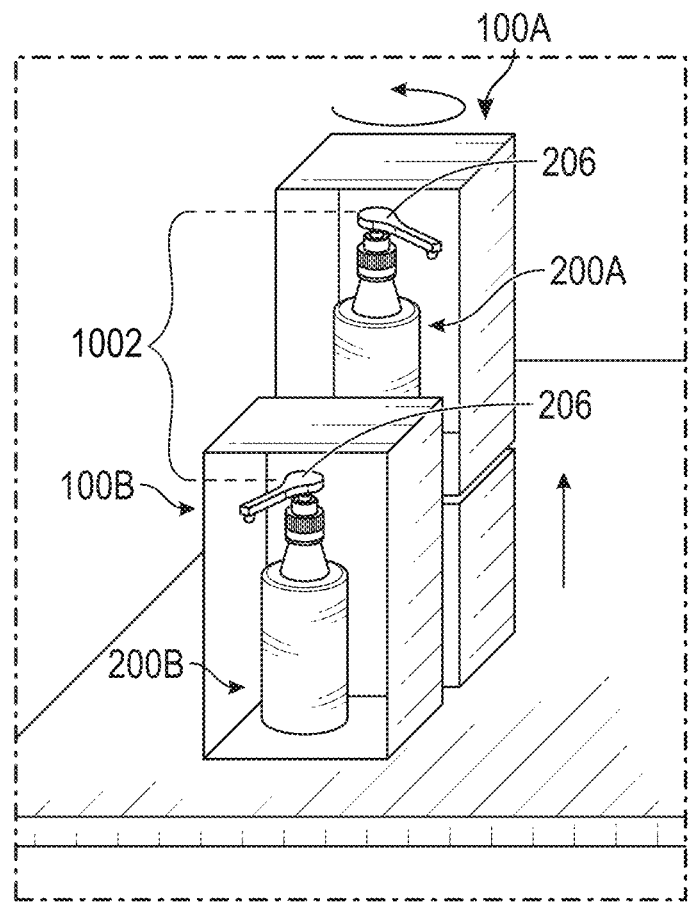
FIG. 10A illustrates the volume-based dispensing system of FIG. 6A with a first automatic volume-based dispenser positioned behind a second automatic volume-based dispenser.
Figure 10B:
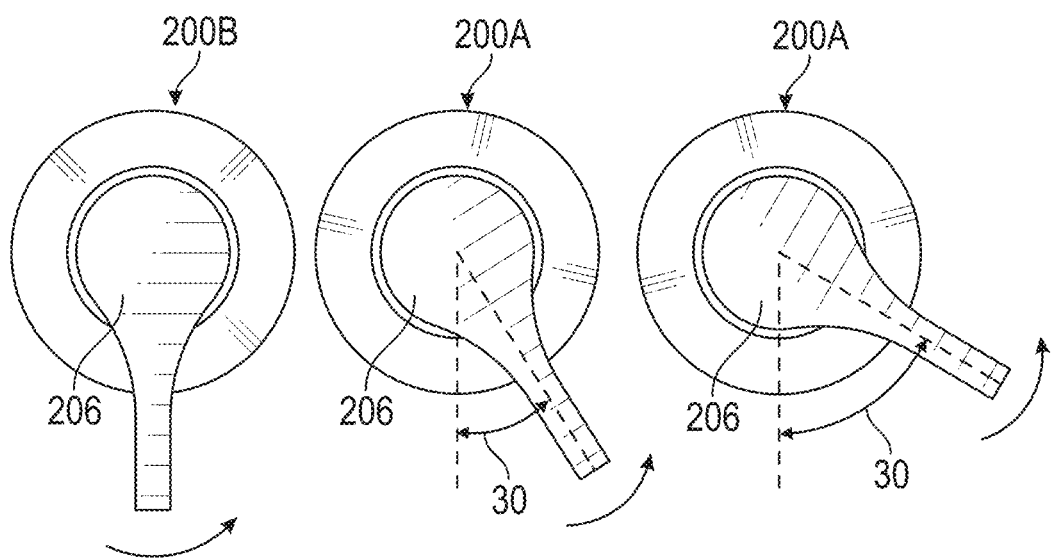
FIG. 10B illustrates pump heads of ingredient dispensers offset by an angle.

In some embodiments, as shown in FIG. 10A, a first automatic dispenser 100A of the plurality of automatic dispensers 100 may be positioned behind a second automatic dispenser 100B of the plurality of automatic dispensers 100. The first automatic dispenser 100A may be positioned so the pump head 206 of a first ingredient dispenser 200A in the first automatic dispenser 100A may be positioned a distance 1002 above the pump head 206 of a second ingredient dispenser 200B in the second automatic dispenser 100B. In some embodiments, as shown in FIG. 10B, the pump head 206 of the first ingredient dispenser 200A in the first automatic dispenser 100A may be offset from the pump head 206 of the ingredient dispenser 200B in the second automatic dispenser 100B by the angle 30. In some embodiments, as described above, the angle 30 may include an angle of about 5 degrees, about 10 degrees, about 15 degrees, about 20 degrees, about 25 degrees about 30 degrees, about 35 degrees, about 45 degrees, about 60 degrees, about 75 degrees, about 90 degrees, and/any value between the aforementioned values. In some embodiments, the angle 30 may include an angle between about 15 degrees and about 45 degrees. In some embodiments, the angle 30 may include an angle between about 25 degrees and about 45 degrees.

Figure 6B:
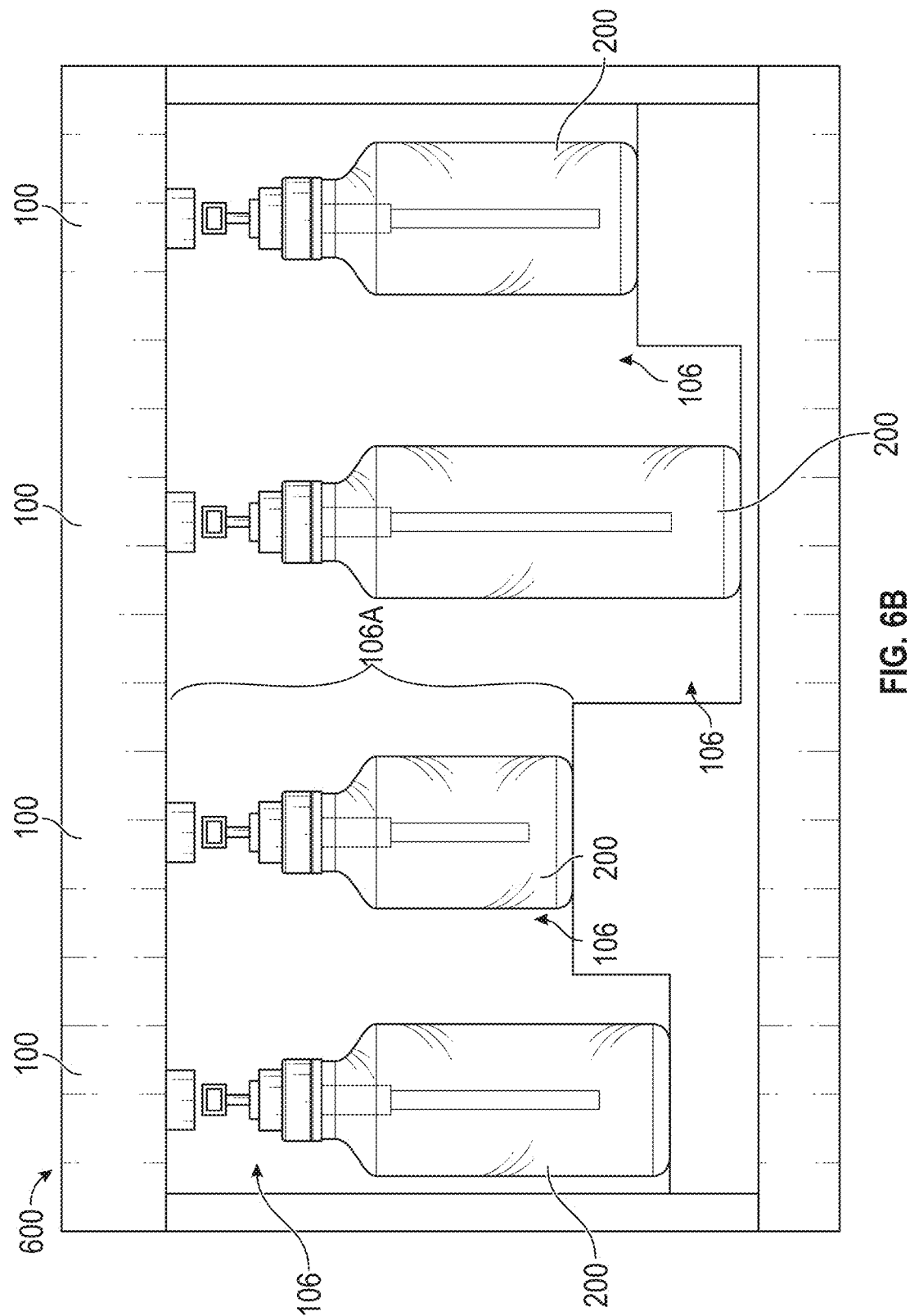

As shown in FIG. 6B, in some embodiments, the plurality of automatic dispensers 100 may be configured to receive different sized ingredient dispensers 200. In some embodiments, the recess 106 of each automatic dispenser 100 may include a height 106A. In some embodiments, the height 106A of the recess 106 of each automatic dispenser 100 may vary based on the size of the ingredient dispenser 200 the automatic dispenser 100 is configured to receive.

Figure 7A:
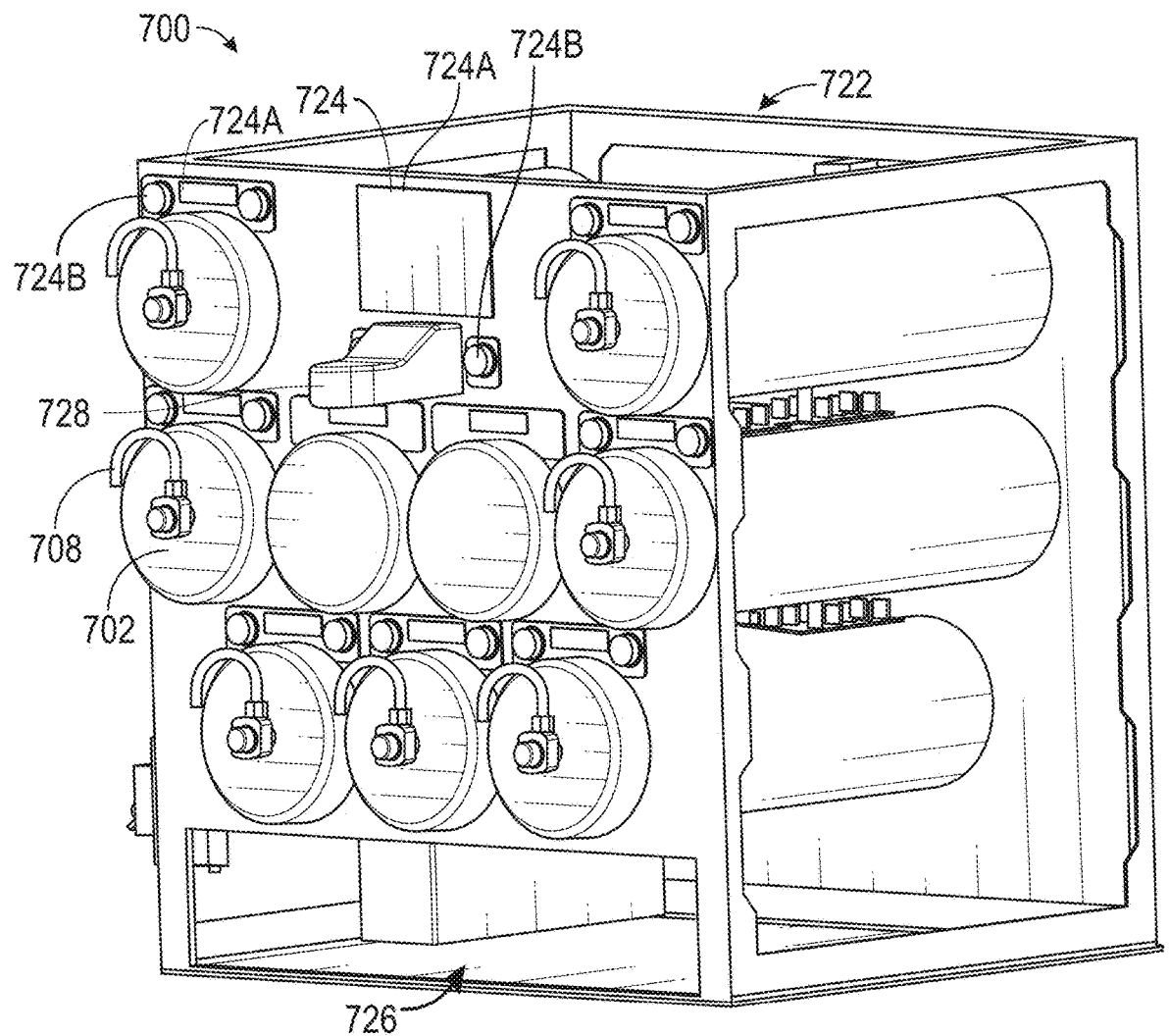
FIGS. 7A-7C illustrate a time-based dispensing system.

FIG. 7A shows a system 700 for time-based dispensing. In some embodiments, the system 700 can include a plurality of dispensers 702. In some embodiments, the plurality of dispensers 702 may include a plurality of modular dispensers as described in U.S. Pat. No. 11,440,784, which is hereby incorporated by reference in its entirety. The plurality of dispensers 702 may be configured to dispense an ingredient type with a consistent viscosity, for example, flavors, syrups, and/or colorings.

Figure 7B:
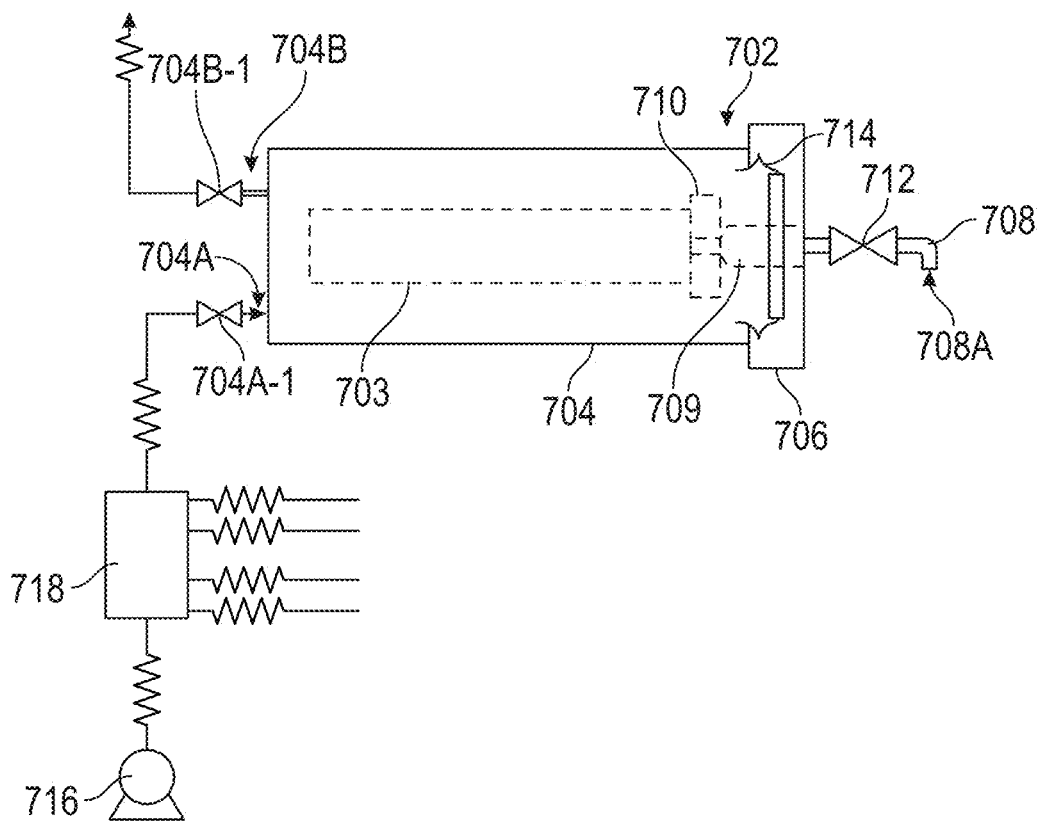

As shown in FIG. 7B, in some embodiments, each dispenser 702 of the plurality of dispensers 702 may include a container 704, a lid 706, and a spout 708. The container 704 may be configured to contain or hold an ingredient. In some embodiments, the ingredient may be packaged into a bag 703 that may be easily inserted into the container 704.

In some embodiments, the lid 706 may be configured to removably couple to an opening of the container 704. The lid 706 may be rotated or twisted relative to the container 704 to couple and/or decoupled the lid 706 and the container 704. The lid 706 may be removed from the container 704 to allow a user to insert the ingredient and/or the bag 703 into the container 704. The lid 706 may include a probe 709 positioned on the lid 706 so the probe 709 extends into the container 704 when the lid 706 is coupled to the container 704. The probe 709 may be inserted into the bag 703. The probe 709 may be configured to pierce or puncture the bag 703 to allow the ingredient packaged in the bag 703 to flow into the probe 709. In some embodiments, the bag 703 may include a fitment 710 configured to couple the bag 703 to the probe 709 and/or the lid 706. The fitment 710 may prevent or inhibit the ingredient packaged in the bag 703 from flowing into the container when the probe 709 is inserted into the bag so the ingredient flows into the probe 709. In some embodiments, a tray configured to receive the bag 703 may include the fitment 710 and the tray may be inserted into the container 704.

In some embodiments, the spout 708 may be coupled or attached to the lid 706. The spout 708 may include an opening 708A configured to dispense the ingredient. The spout 708 may be in fluid communication with the probe 709 such that the ingredient packaged in the bag 703 may flow through the probe 709 to the spout 708 so the spout 708 can dispense the ingredient via the opening 708A.

In some embodiments, the dispenser 702 may include a flow valve 712 between the spout 708 and the probe 709. In some embodiments, the flow valve 712 may be configured to open and/or close. In some embodiments, the flow valve 712 may be non-powered. When the flow valve 712 is open, the flow valve 712 may allow the ingredient to flow through the probe 709 and the spout 708. When the flow valve 712 is closed, the flow valve 712 may prevent or inhibit the ingredient from flowing through the probe 709 and the spout 708. In some embodiments, the flow valve 712 may include a constant flow valve. The flow valve 712 may be configured to maintain a constant flow rate of the ingredient through the probe 709 and the spout 708 so a flow rate of the ingredient dispensed via the opening 708A of the spout 708 is constant.

In some embodiments, a controller 802 (as described further below with reference to FIG. 8B) may open the flow valve 712 to dispense the ingredient in the container 704 via the spout 708. In some embodiments, the controller 802 may open the flow valve 712 to dispense the ingredient for a predetermined dispensing time. The predetermined dispensing time may be based on a number of doses of the ingredient in the container 704 to be dispensed and/or a viscosity of the ingredient.

In some embodiments, the controller 802 may open the flow valve 712 when a user activates an input 724B (as described further below). In some embodiments, the controller 802 may open the flow valve 712 for the predetermined time when the user activates the input 724B. In some embodiments, the controller 802 may open the flow valve 712 for as long as the input 724B is activated by the user.

In some embodiments, the container 704 may be pressurized. The container 704 may include a gasket 714 at or near the opening of the container 704. The gasket 714 may create a seal between the lid 706 and the container 704 when the lid 706 is coupled to the container 704. The seal formed by the gasket 714 may prevent or inhibit gas and/or fluid from leaking out of the container 704 to maintain a pressure in the container 704.

In some embodiments, the container 704 may be pressurized via a compressor 716 and/or an accumulator 718. In some embodiments, the container 704 may include an inlet 704A and an outlet 704B. In some embodiments, the accumulator 718 may be in fluid communication with the container 704 via the inlet 704A. The accumulator 718 may be configured to pressurize the container 704. In some embodiments, the accumulator 718 may be configured to maintain a pressure in the container 704 when the ingredient is dispensed via the opening 708A of the spout 708 so the pressure in the container 704 remains constant regardless of a volume of the ingredient in the bag 703.

In some embodiments, the accumulator 718 may be in fluid communication with the container 704 of each of the plurality of dispensers 702. The accumulator 718 may be configured to pressurize the container 704 of each of the plurality of dispensers 702.

In some embodiments, the compressor 716 may be configured to pressurize the accumulator 718 so a pressure in the accumulator 718 (and the container 704) is maintained when the ingredient is dispensed via the opening 708A of the spout 708.

In some embodiments, the inlet 704A and the outlet 704B of the container may each include a valve 704A-1, 704B-1. In some embodiments, the valve 704B-1 of the outlet 704B may be closed to prevent or inhibit gas and/or fluid from escaping the container 704 by the outlet 704B. In some embodiments, the valve 704A-1 of the inlet 704A may be open to allow gas and/or fluid to enter the container 704 from the accumulator 718 via the inlet 704A.

Figure 7C:
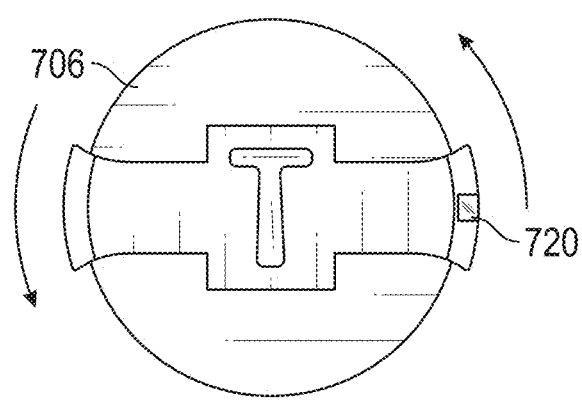

In some embodiments, as shown in FIG. 7C, the container 704 and/or the lid 706 may include one or more sensors 720. The one or more sensors 720 may be configured to detect or determine when the lid 706 is coupled to the container 704 and/or when the lid 706 is decoupled from the container 704. In some embodiments, the one or more sensors 720 may be configured to detect or determine when the lid 706 is rotated or twisted relative to the container 704. In some embodiments, the one or more sensors 720 may provide a signal that indicates when the lid 706 is coupled to the container 704 and/or when the lid 706 is decoupled from the container. The one or more sensors 720 may transmit the signal that may be indicative of when the lid 706 is coupled to and/or decoupled from the container 704 to a controller 802 (described below with reference to FIG. 8B). The one or more sensors 720 may transmit the signal that may be used to indicated when the when the lid 706 is coupled to and/or decoupled from the container 704 in real time or substantially real time.

In some embodiments, in response to the signal the controller 802 may close the valve 704A-1 of the inlet 704A and open the valve 704B-1 of the outlet 704B to automatically depressurize the container 704.

In some embodiments, as shown in FIG. 7A, the system 700 for time-based dispensing may include a housing 722. The housing 722 may be configured to hold the plurality of dispensers 702. In some embodiments, the housing 722 may include a user interface 724. In some embodiments, the housing 722 may include a user interface 724 for each of the plurality of dispensers 702.

The user interface 724 may include a display 724A and one or more inputs 724B. In some embodiments, the display 724A may include a touch screen that includes the one or more inputs 724B. The display 724A may display beverage and/or ingredient information to the user. The display 724A may indicate to a user the ingredient in the dispenser 702 that corresponds to the user interface 724. In some embodiments, the display 724A may indicate to the user a dose size and/or a number of doses to be dispensed by the dispenser 702 that corresponds to the user interface 724. In some embodiments, the display 724A may indicate to the user that the ingredient in the dispenser 702 that corresponds to the user interface is part of a beverage order. In some embodiments, the display 724A may indicate to the user to position a beverage container below the spout 708 of the dispenser 702 that corresponds to the user interface 724.

In some embodiments, the one or more inputs 724B may include buttons or any other physical user input. The one or more inputs 724B include a light, such as an LED, to indicate to the user that the ingredient in the dispenser 702 that corresponds to the user interface is part of a beverage order. The user may activate an input 724B to dispense one or more doses of the ingredient in the dispenser 702 that corresponds to the user interface 724. In some embodiments, the user may activate an input 724B to modify a number of doses of the ingredient the dispenser 702 may dispense.

In some embodiments, the housing 722 may include a secondary housing 726. The secondary housing 726 may store or house a plurality of small containers or cartridges (not shown). The cartridges may store one or more ingredient enhancers. The ingredient enhancers can include flavorings that may include a smaller dose than the ingredients of the dispensers 702.

In some embodiments, the housing 722 may include a dispense point 728. The dispense point 728 may be in fluid communication with each of the cartridges and/or the plurality of dispensers 702. The dispense point 728 may dispense an ingredient from any of the cartridges and/or the plurality of dispensers 702 at a single point so the user does not have to move the beverage container to dispense different ingredients.

Figure 8A:
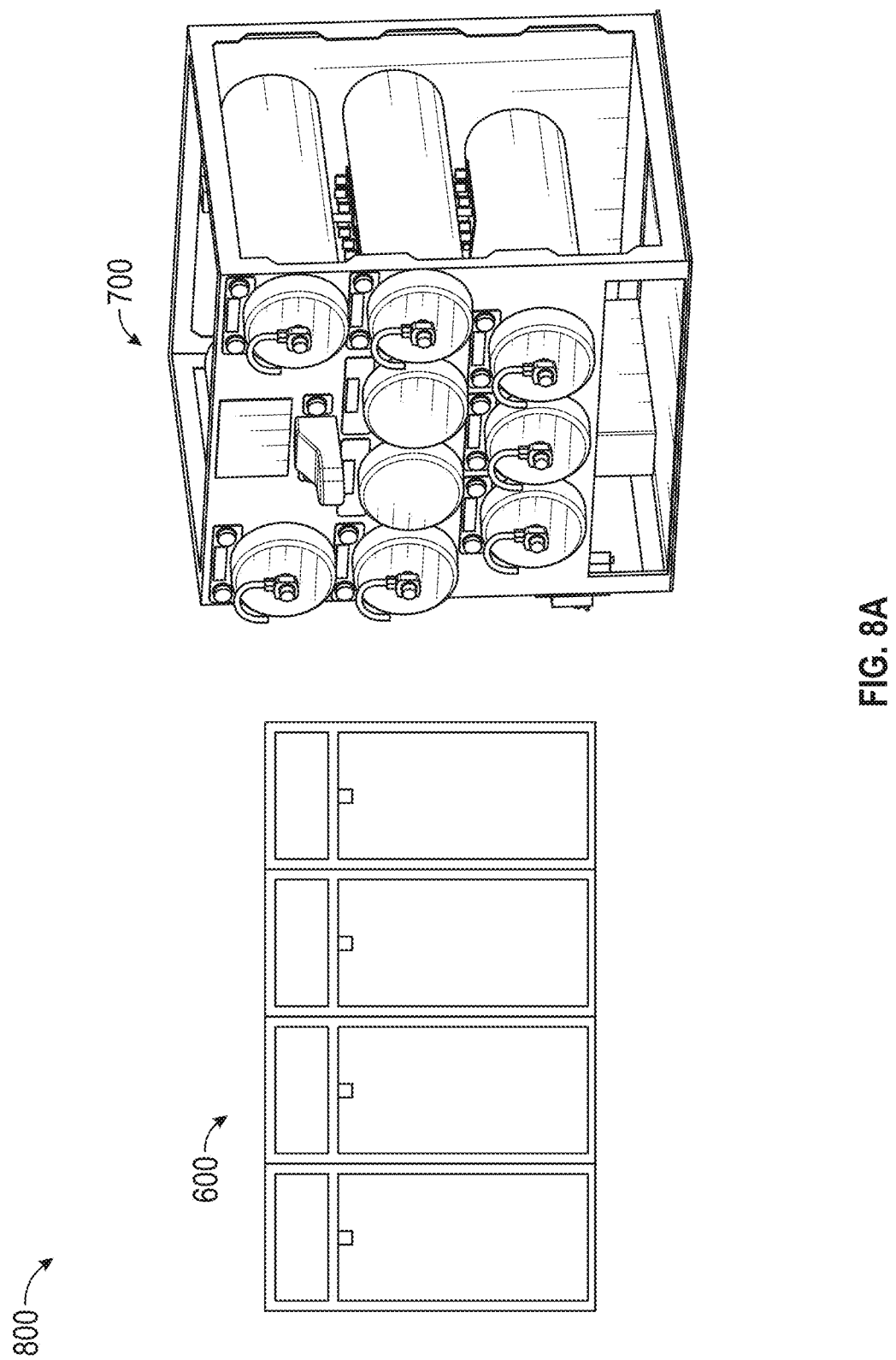
FIG. 8A illustrates an ingredient-based dispensing system with a volume-based dispensing system of FIGS. 6A and 6B and a time-based dispensing system of FIGS. 7A-7C.

FIG. 8A shows a system 800 for hybrid ingredient-based dispensing. In some embodiments, the system 800 can include a system 600 for volume-based dispensing and the system 700 for time-based dispensing. In some embodiments, the system 800 may decouple sauces from syrups, flavors, and/or colorings so sauces are volumetrically dispensed and syrups, flavors, and/or colorings are time dispensed. The system 600 may dispense sauces as described above with reference to FIG. 2A. In some embodiments, the system 700 may dispense syrups, flavors, and/or colorings that may include a consistent viscosity. In some embodiments, the system 800 may automatically dispense sauces via the system 600 for volume-based dispensing and automatically dispense syrups, flavors, and/or colorings via the system 700 for time-based dispensing.

Figure 8B:
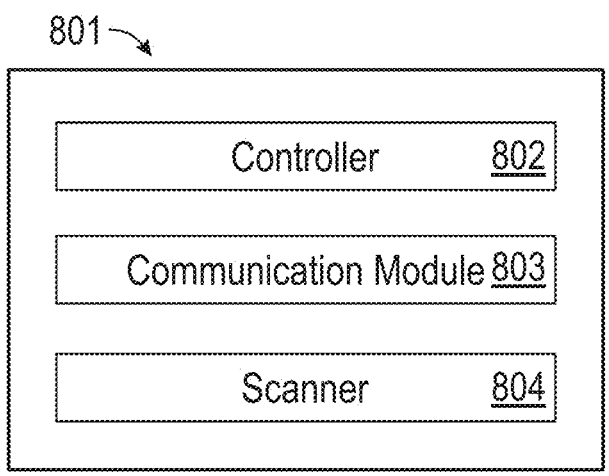
FIG. 8B illustrates a schematic of a control system of the ingredient-based dispensing system of FIG. 8A.

In some embodiments, the system 800 may include a control system 801, as shown in FIG. 8B. The control system 801 may include a controller 802, and/or a communication module 803. The communication module 803 may be configured to transmit and/or receive signals wirelessly or via a wired connection. The communication module 803 may communicate with a point of sale system, the system 600, and/or the system 700. The communication module 803 may receive one or more beverage orders from the point of sale system. The controller 802 may transmit dispensing instructions to the system 600 and/or the system 700. The controller 802 may control the actuation system 104 of each of the plurality of automatic dispensers 100 of the system 600, each dispenser 702 of the system 700, and/or any of the functions described with reference to FIGS. 1-7C and 9. The controller 802 can receive the one or more beverage orders to from the communication module 803.

In some embodiments, the communication module 803 may receive the one or more beverage orders via a scanner 804 configured to scan or read one or more machine readable codes. The one or more machine readable codes may include a barcode, a QR code, and/or any other machine-readable optical label and/or other machine-readable codes. The one or more machine readable codes may contain information that includes one or more beverage orders.

In some embodiments, the system 600 and the system 700 can each include a control system 801. In some embodiments, each automatic dispenser 100 of the system 600 and/or each dispenser 702 of the system 700 can include a control system 801. In some embodiments, the control systems 801 of the system 600 and the system 700 may communicate with the control system 801 of the system 800 wirelessly or via a wired connection.

Figure 9:
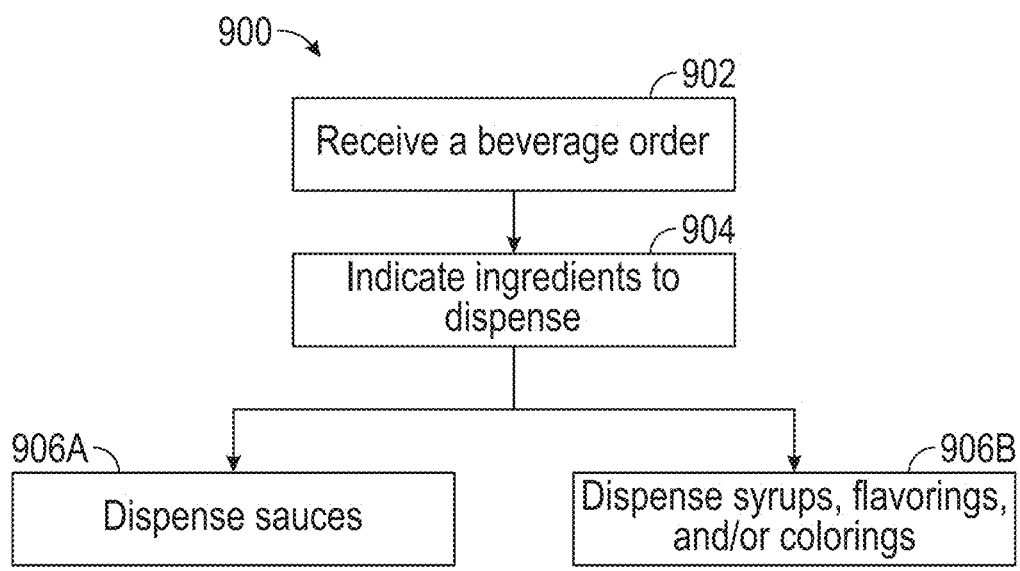
FIG. 9 illustrates a flow chart depicting a method for preparing a beverage with the ingredient-based dispensing system of FIG. 8A.

FIG. 9 shows a method 900 for preparing dispensing at least a portion of a beverage via the system 800. At step 902, the system 800 may receive a beverage order. In some embodiments, the communication module 803 may receive the beverage order from a point of sale system and/or the scanner 804. The beverage order may include one or more ingredients. In some embodiments, the beverage order may include one or more sauces, and/or one or more syrups, flavors, and/or colorings.

In some embodiments, at step 904, the system 800 can indicate which ingredients to dispense. The controller 802 can indicate to a user which ingredients to dispense via the user interface 108 of each automatic dispenser of the system 600 and/or the user interface 724 of the system 700. The controller 802 may indicate to the user a dispensing sequence wherein the dispensing sequence include an order to dispense the one or more ingredients. In some embodiments, the controller 802 may indicate the order by displaying one or more colors via the user interface 108 and/or the user interface 724. In some embodiments, the controller 802 may indicate the order by flashing, pulsing, or changing colors of the user interface 108 and/or the user interface 724. In some embodiments, the controller 802 may indicate the order by displaying a number via the user interface 108 and/or the user interface 724. The controller 802 may indicate to the user a dose size, a number of doses, and/or a total volume of each ingredient to dispense via the user interface 108 and/or the user interface 724.

In some embodiments, the user may dispense the one or more ingredients via the system 800. At step 906A, the user may dispense one or more sauces of the beverage order via the system 600. In some embodiments, the user may place a beverage container at a dispensing point (i.e., at an automatic dispenser 100) of the system 600. In some embodiments, the automatic dispenser 100 may automatically determine when the beverage container is placed at the dispensing point via the one or more sensors of the automatic dispenser 100. The automatic dispenser 100 may dispense a corresponding ingredient (i.e., the ingredient in the ingredient dispenser 200 of the automatic dispenser 100) when the automatic dispenser 100 determines the beverage container is placed at the dispensing point. In some embodiments, the user may dispense the corresponding ingredient via the user interface 108. The user may input a selection to dispense the corresponding ingredient via the user interface 108.

In some embodiments, the system 600 and/or the dispenser 100 may dispense a predetermined dose of the corresponding ingredient. The predetermined dose of the corresponding ingredient may be based on the received beverage order. The system 600 and/or the dispenser 100 may volumetrically dispense the predetermined dose so the system 600 and/or the dispenser 100 dispense a consistent amount of the ingredient regardless of the viscosity of the ingredient.

At step 906B, the user may dispense the one or more syrups, flavors, and/or colorings via the system 700. In some embodiments, the user may place the beverage container at a dispensing point (i.e., the spout 708 of a dispenser 702 or the dispense point 728) of the system 700. In some embodiments, the system 700 may automatically determine when the beverage container is placed at the dispensing point. The system 700 may dispense a corresponding ingredient (i.e., the ingredient in the dispenser 702 or the cartridge) when the system 700 determines the beverage container is place the dispensing point. In some embodiments, the user may dispense the corresponding ingredient via the user interface 724. The user may input a selection to dispense the corresponding ingredient via the system 700 and/or the dispenser 702.

In some embodiments, the system 700 and/or the dispenser 702 may dispense a predetermined dose of the corresponding ingredient. The predetermined dose of the corresponding ingredient may be based on the received beverage order. The system 700 and/or the dispenser 702 may dispense the predetermined dose based on the predetermined dispensing time.

In some embodiments, after the user has dispensed an ingredient via the system 600 and/or the system 700, the controller 802 may indicate to the user via the user interface 108 and/or the user interface 724 that the predetermined dose of the ingredient has been dispensed. The controller 802 may indicate that the predetermined dose of the ingredient ahs been dispensed by displaying one or more colors via the user interface 108 and/or the user interface 724, and/or flashing, pulsing, or changing colors of the user interface 108 and/or the user interface 724.

In some embodiments, the viscosity of the ingredient may include a viscosity of about 1 centipoise (cP), about 10 cP, about 50 cP, about 100 cP, about 110 cP, about 120 cP, about 130 cP, about 140 cP, about 150 cP, about 160 cP, about 170 cP, about 180 cP, about 190 cP, about 200 cP, about 210 cP, about 220 cP, about 230 cP, about 240 cP, about 250 cP, about 260 cP, about 270 cP, about 280 cP, about 290 cP, about 300 cP, about 310 cP, about 320 cP, about 330 cP, about 340 cP, about 350 cP, about 360 cP, about 370 cP, about 380 cP, about 390 cP, about 400 cP, about 410 cP, about 420 cP, about 430 cP, about 440 cP, about 450 cP, about 460 cP, about 470 cP, about 480 cP, about 490 cP, about 500 cP, about 510 cP, about 520 cP, about 530 cP, about 540 cP, about 550 cP, about 560 cP, about 570 cP, about 580 cP, about 590 cP, about 600 cP, about 610 cP, about 620 cP, about 630 cP, about 640 cP, about 650 cP, about 660 cP, about 670 cP, about 680 cP, about 690 cP, about 700 cP, about 710 cP, about 720 cP, about 730 cP, about 740 cP, about 750 cP, about 760 cP, about 770 cP, about 780 cP, about 790 cP, about 800 cP, about 810 cP, about 820 cP, about 830 cP, about 840 cP, about 850 cP, about 860 cP, about 870 cP, about 880 cP, about 890 cP, about 900 cP, about 910 cP, about 920 cP, about 930 cP, about 940 cP, about 950 cP, about 960 cP, about 970 cP, about 980 cP, about 990 cP, about 1,000 cP, about 1,500 cP, about 2,000 cP, about 2,500 cP, about 3,000 cP, about 3,500 cP, about 4,000 cP, about 4,500 cP, about 5,000 cP, about 10,000 cP, about 20,000 cP, about 30,000 cP, about 40,000 cP, about 50,000 cP, about 70,000, about 100,000 cP, and/or any value between the aforementioned values. In some embodiments, the viscosity of the ingredient may include a viscosity between about 1 cP and about 200 cP. In some embodiments, the viscosity of the ingredient may include a viscosity between about 10 cP and about 100 cP. In some embodiments, the viscosity of the ingredient may include a viscosity between about 200 cP to about 70,000 cP. In some embodiments, the viscosity of the ingredient may include a viscosity between about 350 cP and about 450 cP. In some embodiments, the viscosity of the ingredient may include a viscosity between about 400 cP and about 410 cP.

In some embodiments, the dose size of the ingredient may include a volume of about 0.001 fl oz, about 0.002 fl oz, about 0.003 fl oz, about 0.004 fl oz, about 0.005 fl oz, about 0.006 fl oz, about 0.007 fl oz, about 0.008 fl oz, about 0.009 fl oz, about 0.010 fl oz, about 0.011 fl oz, about 0.012 fl oz, about 0.013 fl oz, about 0.014 fl oz, about 0.015 fl oz, about 0.020 fl oz, about 0.030 fl oz, about 0.040 fl oz, about 0.050 fl oz, about 0.10 fl oz, about 0.15 fl oz, about 0.20 fl oz, about 0.25 fl oz, about 0.30 fl oz, about 0.35 fl oz, about 0.40 fl oz, about 0.45 fl oz, about 0.50 fl oz, about 0.55 fl oz, about 0.60 fl oz, about 0.65 fl oz, about 0.70 fl oz, about 0.75 fl oz, about 0.80 fl oz, about 0.85 fl oz, about 0.90 fl oz, about 0.95 fl oz, about 1.0 fl oz, about 2.0 fl oz, about 3.0 fl oz, about 4.0 fl oz, about 5.0 fl oz, about 6.0 fl oz, about 7.0 fl oz, about 8.0 fl oz, about 9.0 fl oz, about 10.0 fl oz, about 15.0 fl oz, about 20.0 fl oz, and/or any value between the aforementioned values. In some embodiments, the predetermined volume of ingredient may include a volume between about 0.001 fl oz and about 0.015 fl oz. In some embodiments, the dose size ingredient may include a volume between about 0.004 fl oz and about 0.010 fl oz. In some embodiments, the predetermined volume of ingredient may include a volume between about 0.050 fl oz and about 1.0 fl oz. In some embodiments, the dose size of the ingredient may include between about 0.10 and about 0.50 fl oz.

Certain Terminology

As used herein, the term "beverage" has its ordinary and customary meaning, and includes, among other things, any edible liquid or substantially liquid substance or product having a flowing quality (e.g., juices, coffee beverages, teas, milk, beer, wine, cocktails, liqueurs, spirits, cider, soft drinks, flavored water, energy drinks, soups, broths, combinations of the same, or the like).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. Numbers preceded by a term such as "about" or "approximately" include the recited numbers and should be interpreted based on the circumstances (e.g., as accurate as reasonably possible under the circumstances, for example. For example, "about 1 gram" includes "1 gram." In the embodiments described in this application, terms such as "about" or "approximately" within the specification or claims that precede values or ranges can be omitted such that this application specifically includes embodiments of the recited values or ranges with the terms "about" or "approximately" omitted from such values and ranges such that they can also be claimed without the terms "about" or "approximately" before the disclosed range. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

The following example embodiments identify some possible permutations of combinations of features disclosed herein, although other permutations of combinations of features are also possible.

SUMMARY

Although certain aspects, advantages, and features are described herein, it is not necessary that any particular embodiment include or achieve any or all of those aspects, advantages, and features. For example, some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable. In addition, although this disclosure describes certain embodiments and examples of beverage systems and methods, many aspects of the above-described systems and methods may be combined differently and/or modified to form still further embodiments or acceptable examples. All such modifications and variations are intended to be included herein within the scope of this disclosure.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. The figures are drawn to scale, but such scale should not be interpreted to be limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of beverage dispensing systems and methods have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. An ingredient based dispensing system comprising:
   a volume-based dispensing system comprising one or more volume-based dispensers configured to dispense ingredients of a first ingredient type, wherein the ingredients of the first ingredient type have a viscosity that is inconsistent;
   a time-based dispensing system comprising one or more time-based dispensers configured to dispense ingredients of a second ingredient type, wherein the ingredients of the second ingredient type have a viscosity that is consistent;
   a control system comprising:
   a communication module configured to receive a beverage order comprising one or more ingredients and a number of doses of each ingredient of the one or more ingredients; and
   a controller configured to communicate instructions for dispensing the one or more ingredients to the volume-based dispensing system and the time-based dispensing system based on the beverage order,
   wherein the controller is configured to communicate instructions for dispensing each ingredient of the one or more ingredients of the first ingredient type to the volume-based dispensing system to cause the volume-based dispensing system to volumetrically dispense the number of doses of each ingredient of the one or more ingredients of the first ingredient type,
   wherein the controller is configured to communicate instructions for dispensing each ingredient of the one or more ingredients of the second ingredient type to the time-based dispensing system to cause the time-based dispensing system to dispense the number of doses of each ingredient of the one or more ingredients of the second ingredient type based on a predetermined dispensing time for the number of doses.

2. The ingredient based dispensing system of claim 1, wherein the one or more volume-based dispensers each comprise:
   a housing configured to receive a manual pump dispenser via a recess in the housing, wherein the manual pump dispenser comprises a container configured to hold the first ingredient type, and a pump configured to dispense the first ingredient type when a pump head of the pump is displaced;
   an actuation system configured to displace the pump head of the manual pump dispenser.

3. The ingredient based dispensing system of claim 1, wherein the first ingredient type comprises sauces.

4. The ingredient based dispensing system of claim 1, wherein the viscosity of ingredients of the first ingredient type varies between about 8 percent and about 80 percent.

5. The ingredient based dispensing system of claim 2, wherein the actuation system comprises a linear actuation system, a rail actuation system, a fulcrum actuation system, a rotary actuation system, a pulley actuation system, and/or a platform actuation system.

6. The ingredient based dispensing system of claim 1, wherein the one or more volume-based dispensers each comprise:
   a housing configured to receive a manual pump dispenser via a recess in the housing, wherein the manual pump dispenser comprises a container configured to hold the first ingredient type, and a pump configured to dispense the first ingredient type when a pump head of the pump is actuated;

an actuation system configured to displace the container of the manual pump dispenser in order to actuate the pump head so the pump head remains stationary.

7. The ingredient based dispensing system of claim 1, wherein the one or more time-based dispensers each comprise:

a container configured to hold the second ingredient type, the container comprising a lid removably coupled to the container;

a spout configured to dispense the second ingredient type, the spout comprising a valve configured to open and close the spout for a predetermined time.

8. The ingredient based dispensing system of claim 1, wherein the second ingredient type comprises one or more of flavors, syrups, and/or colorings.

9. The ingredient based dispensing system of claim 2, wherein the actuation system is configured to apply a first force to the pump head of the manual pump dispenser to displace the pump head in a first direction, and the actuation system is configured to apply a second force to the pump head of the manual pump dispenser to displace the pump head in a second direction opposite the first direction.

10. The ingredient based dispensing system of claim 1, wherein the volume-based dispensing system is configured to dispense the one or more ingredients of the first ingredient type into a vessel positioned under one or more spouts of the volume-based dispensing system, and the time-based dispensing system is configured to dispense the one or more ingredients of the second ingredient type into a vessel positioned under one or more spouts of the volume-based dispensing system.

* * * * *